United States Patent
Jung et al.

(10) Patent No.: US 9,337,543 B2
(45) Date of Patent: May 10, 2016

(54) ANTENNA DEVICE AND MOBILE TERMINAL HAVING THE SAME

(71) Applicant: LG ELECTRONICS INC., Seoul (KR)

(72) Inventors: Byungwoon Jung, Seoul (KR); Jaewoo Lee, Seoul (KR); Daeyong Kwak, Seoul (KR); Hanphil Rhyu, Seoul (KR); Sungjung Rho, Seoul (KR)

(73) Assignee: LG Electronics Inc., Seoul (KR)

( * ) Notice: Subject to any disclaimer, the term of this patent is extended or adjusted under 35 U.S.C. 154(b) by 247 days.

(21) Appl. No.: 13/922,276

(22) Filed: Jun. 20, 2013

(65) Prior Publication Data

US 2013/0342411 A1    Dec. 26, 2013

(30) Foreign Application Priority Data

Jun. 21, 2012  (KR) .......................... 10-2012-0066744
Nov. 22, 2012 (KR) .......................... 10-2012-0133296

(51) Int. Cl.
    *H01Q 13/10*    (2006.01)
    *H01Q 1/24*     (2006.01)
    *H01Q 21/28*    (2006.01)
    *H01Q 5/307*    (2015.01)

(52) U.S. Cl.
    CPC .............. *H01Q 13/106* (2013.01); *H01Q 1/243* (2013.01); *H01Q 5/307* (2015.01); *H01Q 13/10* (2013.01); *H01Q 21/28* (2013.01)

(58) Field of Classification Search
    CPC ....... H01Q 13/10; H01Q 13/085; H01Q 1/38; H01Q 9/0407
    USPC .......................................... 343/767, 702, 867
    See application file for complete search history.

(56) References Cited

U.S. PATENT DOCUMENTS

| 2008/0198088 | A1* | 8/2008 | Lin ........................ | H01Q 1/243 343/850 |
| 2008/0284670 | A1 | 11/2008 | Kanno et al. | |
| 2008/0309563 | A1* | 12/2008 | Wang ..................... | H01Q 1/243 343/702 |
| 2008/0316115 | A1 | 12/2008 | Hill et al. | |
| 2009/0273524 | A1 | 11/2009 | Furuya et al. | |
| 2010/0176997 | A1* | 7/2010 | Ikegaya ................. | H01Q 5/364 343/702 |
| 2010/0214181 | A1 | 8/2010 | Ryou et al. | |
| 2011/0001673 | A1 | 1/2011 | You et al. | |

(Continued)

FOREIGN PATENT DOCUMENTS

| CN | 201238074 Y | 5/2009 |
| CN | 101675556 A | 3/2010 |

(Continued)

*Primary Examiner* — Dameon E Levi
*Assistant Examiner* — Collin Dawkins
(74) *Attorney, Agent, or Firm* — Birch, Stewart, Kolasch & Birch, LLP

(57) ABSTRACT

A mobile terminal comprises: a terminal body having an upper part and a lower part; and an antenna device disposed on the upper part or the lower part of the terminal body, and configured to transmit and receive radio signals, wherein the antenna device comprises: a first member and a second member which form a slot of which one side is open; a feeding portion having one end connected to one of the first member and the second member such that the antenna device resonates in a first frequency band, and forming an electric field in the slot; and a feeding extension portion extending from the feeding portion such that the antenna device resonates in a second frequency band.

17 Claims, 17 Drawing Sheets

(56) References Cited

U.S. PATENT DOCUMENTS

| | | | |
|---|---|---|---|
| 2011/0057859 A1* | 3/2011 | Rho | H01Q 9/0421 343/893 |
| 2011/0074642 A1* | 3/2011 | Miller | H01Q 13/18 343/705 |
| 2011/0136447 A1* | 6/2011 | Pascolini | H01Q 1/243 455/90.2 |
| 2012/0098721 A1* | 4/2012 | Wong | H01Q 1/243 343/749 |
| 2012/0127055 A1* | 5/2012 | Yamagajo | H01Q 1/243 343/850 |
| 2012/0149314 A1* | 6/2012 | Shimasaki | H01Q 1/2266 455/90.2 |

FOREIGN PATENT DOCUMENTS

| | | |
|---|---|---|
| CN | 101682119 A | 3/2010 |
| CN | 102110873 A | 6/2011 |
| EP | 1 309 156 A1 | 5/2003 |
| EP | 2 509 158 A2 | 10/2012 |
| JP | 58-54703 A | 3/1983 |

\* cited by examiner

ANTENNA DEVICE AND MOBILE TERMINAL HAVING THE SAME

CROSS-REFERENCE TO RELATED APPLICATION

Pursuant to 35 U.S.C. §119(a), this application claims the benefit of earlier filing date and right of priority to Korean Application No. 10-2012-0066744, filed on Jun. 21, 2012 and Korean Application No. 10-2012-0133296, filed on Nov. 22, 2012. The contents of all these applications are incorporated by reference herein in their entirety.

BACKGROUND OF THE DISCLOSURE

1. Field of the Disclosure

The present disclosure relates to a mobile terminal, and particularly, to a mobile terminal having an antenna device capable of transmitting and receiving (transceiving) radio signals.

2. Background of the Disclosure

A mobile terminal is a device that can be carried around and has one or more functions such as to perform voice and video call communications, inputting and outputting information, storing data, and the like.

As functions of the mobile terminal become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or a device.

Various attempts have been made to implement complicated functions in such a multimedia device by means of hardware or software. For instance, a User Interface (UI) environment is provided in a mobile terminal to enable a user to easily and conveniently search for or select a desired function.

Besides such various attempts, various designs for enhancing a function of the hardware, etc. may be considered. The various designs include structural changes and improvements to enhance a user's convenience. For the structural changes and improvements, an antenna device for transmitting and receiving radio electromagnetic waves may be considered.

An antenna is a device configured to transmit and receive radio electromagnetic waves for radio communication, which is absolutely required by the mobile terminal. As the mobile terminal is provided with various functions such as WiBro and DMB, rather than a voice call, the antenna should be configured to implement bandwidths which satisfy such functions, and should be designed in a small size.

In order to meet such demand, antennas capable of implementing a multi-frequency band are being designed. However, such antennas have a complicated structure, and it is difficult to independently control parameter values which determine antenna characteristics such as a resonance frequency, a bandwidth and a gain. In order to solve such problems, an antenna device having a new structure is being actively ongoing.

Connection structures, which are configured to electrically connect a common electrode of a liquid crystal display (LCD) device with electrodes of a touch sensor, are implemented in a separate manner. This may cause a difficulty in miniaturizing the mobile terminal.

SUMMARY OF THE DISCLOSURE

Therefore, an aspect of the detailed description is to provide a mobile terminal having an antenna device capable of transmitting and receiving (transceiving) radio electromagnetic waves in multi frequency bands.

To achieve these and other advantages and in accordance with the purpose of this specification, as embodied and broadly described herein, there is provided an antenna device, comprising: a first member and a second member which form a slot having an open part which is open and a connection part which is closed; a feeding portion having one end connected to one of the first member and the second member such that the antenna device resonates in a first frequency band, and forming an electric field in the slot; and a feeding extension portion extending from the feeding portion such that the antenna device resonates in a second frequency band.

According to an embodiment of the present invention, a length of the slot, which is from the connection part to the open part of the slot, may correspond to $\lambda/4$ or $\lambda/8$ with respect to a wavelength of a center frequency of the first frequency band.

According to an embodiment of the present invention, the feeding portion may be spaced from the connection part by a first distance, and the feeding extension portion may extend from the feeding portion by a second distance.

According to an embodiment of the present invention, the first distance may be formed such that an impedance of the center frequency of the first frequency band is within 50 ohm by the feeding portion, and the second distance may be formed such that an impedance of a center frequency of the second frequency band is within 50 ohm by the feeding extension portion.

According to an embodiment of the present invention, the feeding portion may comprise a shunt element.

According to an embodiment of the present invention, the feeding extension portion may comprise a series element.

According to an embodiment of the present invention, the feeding extension portion may be formed on one of the first member and the second member.

According to an embodiment of the present invention, at least part of the feeding extension portion may be spaced from one of the first member and the second member, and may extend in parallel thereto.

According to an embodiment of the present invention, the antenna device may further comprise a third member extending from one of the first member and the second member with a prescribed length such that the antenna device resonates at a third frequency adjacent to the center frequency of the second frequency band, and the third member configured to extend a bandwidth of the second frequency band.

To achieve these and other advantages and in accordance with the purpose of this specification, as embodied and broadly described herein, there is also provided a mobile terminal, comprising: a terminal body having an upper part and a lower part; and an antenna device disposed on the upper part or the lower part of the terminal body, and configured to transmit and receive radio signals, wherein the antenna device comprises: a first member and a second member which form a slot having an open part which is open and a connection part which is closed; a feeding portion having one end connected to one of the first member and the second member such that the antenna device resonates in a first frequency band, and forming an electric field in the slot; and a feeding extension portion extending from the feeding portion such that the antenna device resonates in a second frequency band.

According to an embodiment of the present invention, the upper part or the lower part of the terminal body, to which the antenna device is mounted, may be formed to be slimmer than other parts of the terminal body.

According to an embodiment of the present invention, one of the first member and the second member may be a conductive frame mounted in the terminal body, and configured to support inside of the terminal body.

According to an embodiment of the present invention, one of the first member and the second member may be a flexible printed circuit board (FPCB) mounted in the terminal body, and configured to transmit a signal generated from a user input unit to a controller.

According to an embodiment of the present invention, one of the first member and the second member may be a flexible printed circuit board (FPCB) mounted in the terminal body, and configured to transmit signals input and output from a socket connected to an external device, to a controller.

According to an embodiment of the present invention, one of the first member and the second member may be a conductive case which forms an appearance of the terminal body.

According to an embodiment of the present invention, one of the first member and the second member may be a multi-layered printed circuit board having a ground.

According to an embodiment of the present invention, the mobile terminal may further comprise a conductive case which forms an appearance of the terminal body, and an opening communicated with the slot may be formed at the conductive case.

According to an embodiment of the present invention, the conductive case may comprise a first conductive case and a second conductive case, and the first conductive case may be separated from the second conductive case by the opening and the socket.

According to an embodiment of the present invention, a third member, which is diverged from one of the first member and the second member such that a bandwidth of the second frequency band is extended, may be formed in parallel to the first conductive case.

According to an embodiment of the present invention, another antenna device, which is configured to transmit and receive radio signals in a fourth frequency band, may be disposed to cover the antenna device.

The present invention may have the following advantages.

Firstly, the antenna device can operate as a slot antenna, and can have antenna efficiency in a plurality of frequency bands.

Secondly, as the slot of the antenna device is formed at a gap required in the mobile terminal due to an allowance (tolerance), an inner space of the mobile terminal can be utilized in a more efficient manner.

Thirdly, even if the antenna device is disposed near the conductive case, the first conductive case is separated from the second conductive case. Under such configuration, an electromagnetic influence on the antenna device can be reduced, and thus lowering of performance of the antenna device can be prevented.

Fourthly, as a user's contact, which may influence on the antenna device, is performed only on the second conductive case. This can reduce lowering of performance of the antenna device due to a body effect.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Hereinafter, an antenna device and a mobile terminal having the same according to the present disclosure will be explained in more detail with reference to the attached drawings. The suffixes "module" and "unit or portion" for components used in the following description merely provided only for facilitation of preparing this specification, and thus they are not granted a specific meaning or function. For the sake of brief description with reference to the drawings, the same or equivalent components will be provided with the same reference numbers, and description thereof will not be repeated.

Singular expressions include plural expressions which do not have any obviously different meaning in view of a context.

The mobile terminal according to the present invention may include a portable phone, a smart phone, a laptop computer, a digital broadcasting terminal, Personal Digital Assistants (PDA), Portable Multimedia Player (PMP), a navigation system, etc. However, it will be obvious to those skilled in the art that the present invention may be also applicable to a fixed terminal such as a digital TV and a desktop computer.

Figure 1:
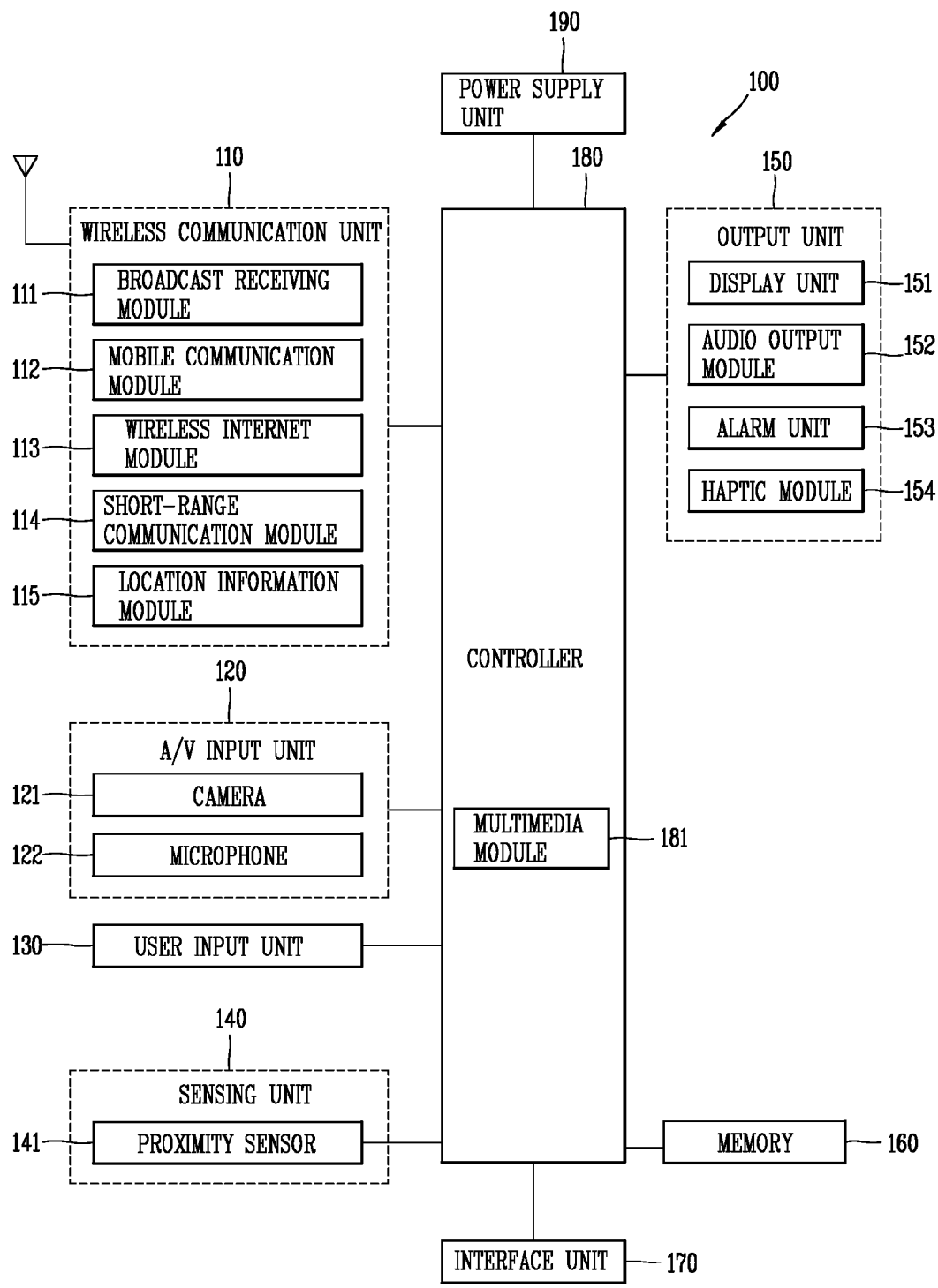
FIG. 1 is a block diagram of a mobile terminal according to an embodiment of the present invention.

The mobile terminal 100 may comprise components, such as a wireless communication unit 110, an Audio/Video (A/V) input unit 120, a user input unit 130, a sensing unit 140, an output module 150, a memory 160, an interface unit 170, a controller 180, a power supply unit 190, and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position information module 115 and the like.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcasting signals and/or broadcasting associated information received through the broadcast receiving module 111 may be stored in the memory 160.

The mobile communication module 112 transmits/receives wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The wireless internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position information module 115 denotes a module for sensing or calculating a position of a mobile terminal. An example of the position information module 115 may include a Global Position System (GPS) module.

Referring to FIG. 1, the A/V input unit 120 is configured to receive an audio or video signal. The A/V input unit 120 may include a camera 121, a microphone 122 or the like. The camera 121 processes image frames such as still images or moving images acquired by an image sensor in a video call mode or an image capturing mode. The processed image frames may be displayed on a display unit 151.

The image frames processed by the camera 121 may be stored in the memory 160 or transmitted to the outside via the wireless communication unit 110. Two or more cameras 121 may be provided according to the configuration of the mobile terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated while receiving and transmitting audio signals.

The user input unit 130 may generate input data for allowing a user to control various operations of the mobile communication terminal. The user input unit 130 may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of user contact with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is open or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner. The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, or a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of these displays may be configured to be transparent so that outside may be seen therethrough, which may be referred to as a transparent display. A representative example of the transparent display may include a Transparent Organic Light Emitting Diode (TOLED), and the like. The rear surface portion of the display unit 151 may also be implemented to be optically transparent. Under such configuration, a user can view an object positioned at a rear side of a body through a region occupied by the display unit 151 of the body.

The display unit 151 may be implemented in two or more in number according to a configured aspect of the mobile terminal 100. For instance, a plurality of displays may be arranged on one surface integrally or separately, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the mobile terminal blocked by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, capacitance type proximity sensor, a magnetic type proximity sensor, an infrared rays proximity sensor, and so on. When the touch screen is implemented as capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, and so on.

The alarm unit 153 may provide outputs to inform about the occurrence of an event of the mobile terminal 100. Typical events may include call reception, message reception, key signal inputs, a touch input, etc. In addition to audio or video outputs, the alarm unit 153 may provide outputs in a different manner to inform about the occurrence of an event. The video signal or the audio signal may be output via the display unit 151 or the audio output module 152. Accordingly, the display unit 151 or the audio output module 152 may be classified as part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data relating to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 serves to supply power to each component by receiving external power or internal power under control of the controller 180.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Figure 2:
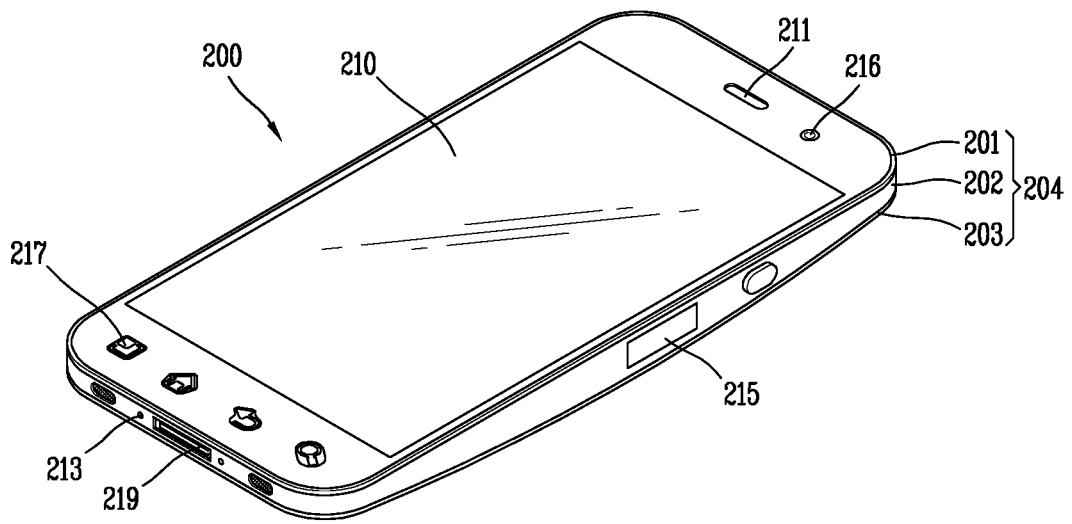
FIG. 2 is a front perspective view of a mobile terminal according to an embodiment of the present invention.
Figure 3:
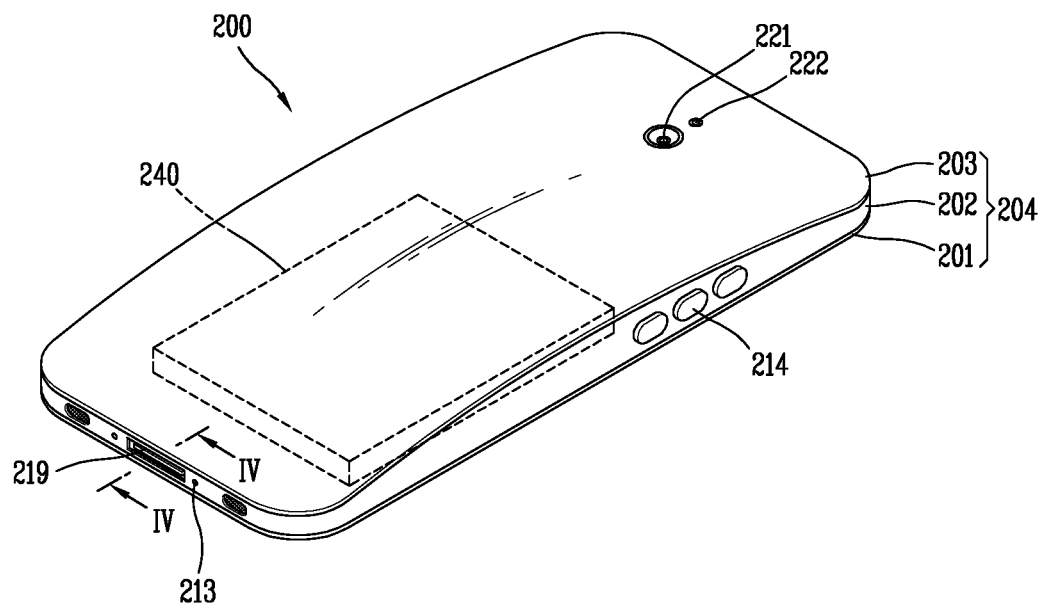
FIG. 3 is a rear perspective view of the mobile terminal of FIG. 2.

FIG. 2 is a front perspective view of a mobile terminal according to the present invention, and FIG. 3 is a rear perspective view of the mobile terminal of FIG. 2.

Referring to FIGS. 2 and 3, the mobile terminal 200 according to the present invention is provided with a bar type terminal body 204. However, the present invention is not limited to this, but may be applied to a slide type in which two or more bodies are coupled to each other so as to perform a relative motion, a folder type, a swing type, and the like. Further, the mobile terminal of the present invention may be applied to any portable electronic device having a camera and a flash, for instance, a portable phone, a smart phone, a notebook computer, a digital broadcasting terminal, Personal Digital Assistants (PDAs), Portable Multimedia Players (PMO), etc.

The mobile terminal 200 includes a terminal body 204 which forms the appearance thereof.

A case (casing, housing, cover, etc.) which forms the appearance of the terminal body 204 may include a front case 201, a rear case 202, and a battery cover 203 for covering the rear surface of the rear case 202.

A space formed by the front case 201 and the rear case 202 may accommodate various components therein. Such cases may be formed by injection-molded synthetic resin, or may be formed using a metallic material such as stainless steel (STS) or titanium (Ti).

On the front surface of the terminal body 204, may be disposed a display unit 210, a first audio output unit 211, a front camera 216, a side key 214, an interface unit 215, and a user input unit 217.

The display unit 210 includes a liquid crystal display (LCD) module, organic light emitting diodes (OLED) module, e-paper, etc., each for visually displaying information. The display unit 210 may include a touch sensing means for inputting information in a touch manner. Hereinafter, the display unit 210 including the touch sensing means is called 'touch screen'. Once part on the touch screen 210 is touched, content corresponding to the touched position is input. The content input in a touch manner, may be characters, or numbers, or menu items which can be set in each mode. The touch sensing means may be transmissive so that the display can be viewed, and may include a structure for enhancing visibility of the touch screen at a bright place. Referring to FIG. 2, the touch screen 210 occupies most of the front surface of the front case 201.

The first audio output unit 211 may be implemented as a receiver for transmitting a call sound to a user's ear, or a loud speaker for outputting each type of alarm sound or a playback sound of multimedia.

The front camera 216 processes image frames such as still images or moving images, acquired by an image sensor in a video call mode or a capturing mode. The processed image frames may be displayed on the display unit 210.

The image frames processed by the front camera 216 may be stored in the memory 160, or may be transmitted to the outside through the wireless communication unit 110. The front camera 216 may be implemented in two or more according to a user's interface.

The user input unit 217 is manipulated to receive a command for controlling the operation of the mobile terminal 200, and may include a plurality of input keys. The input keys may be referred to as manipulation portions, and may include any type of ones that can be manipulated in a user's tactile manner.

For instance, the user input unit 217 may be implemented as a dome switch, or a touch screen, or a touch pad for inputting commands or information in a user's push or touch manner. Alternatively, the user input unit 217 may be implemented, for example, as a wheel for rotating a key, a jog, or a joystick. The user input unit 217 is configured to input various commands such as START, END and SCROLL.

A side key 214, an interface unit 215, an audio input unit 213, etc. are disposed on the side surface of the front case 201.

The side key 214 may be called 'manipulation unit', and may be configured to receive commands for controlling the operation of the mobile terminal 200. The side key 214 may include any type of ones that can be manipulated in a user's tactile manner. Content input by the side key 214 may be variously set. For instance, through the side key 214, may be input commands such as controlling the front and rear cameras 216 and 221, controlling the level of sound output from the audio output unit 211, and converting a current mode of the display unit 210 into a touch recognition mode.

The audio output unit 213 may be implemented as a microphone for receiving a user's voice, other sound, etc.

The interface unit 215 serves a path through which the mobile terminal 200 performs data exchange, etc. with an external device. For example, the interface unit 215 may be at least one of a connection terminal through which the mobile terminal 200 is connected to an ear phone by cable or radio, a port for local area communication, e.g., an infrared data association (IrDA) port, a Bluetooth portion, a wireless LAN port, and power supply terminals for supplying power to the mobile terminal 200. The interface unit 215 may be a card socket for accommodating an external card such as a subscriber identification module (SIM) card, a user identity module (UIM) card or a memory card for storing information.

A power supply unit 240 and the rear camera 221 are disposed on the rear surface of the body 204.

A flash 222 and a mirror (not shown) may be disposed close to the rear camera 221. When capturing an object by using the rear camera 221, the flash 222 provides light onto the object.

When the user captures an image of himself/herself by using the rear camera 221, the mirror can be used for the user to look at himself/herself therein.

The rear camera 221 may face a direction which is opposite to a direction faced by the front camera 216, and may have different pixels from those of the front camera 216.

For example, the front camera 216 may operate with relatively lower pixels (lower resolution). Thus, the front camera 216 may be useful when a user can capture his face and send it to another party during a video call or the like. On the other hand, the rear camera 221 may operate with a relatively higher pixels (higher resolution) such that it can be useful for a user to obtain higher quality pictures for later use. The front camera 216 and the rear camera 221 may be installed at the terminal body 204 so as to rotate or pop-up.

The power supply unit 240 is configured to supply power to the mobile terminal 200. The power supply unit 240 may be mounted in the terminal body 204, or may be detachably mounted to the terminal body 204. FIGS. 2 and 3 also illustrate the terminal 100 including a socket 219 to which an external device is electrically connected.

Figure 4:
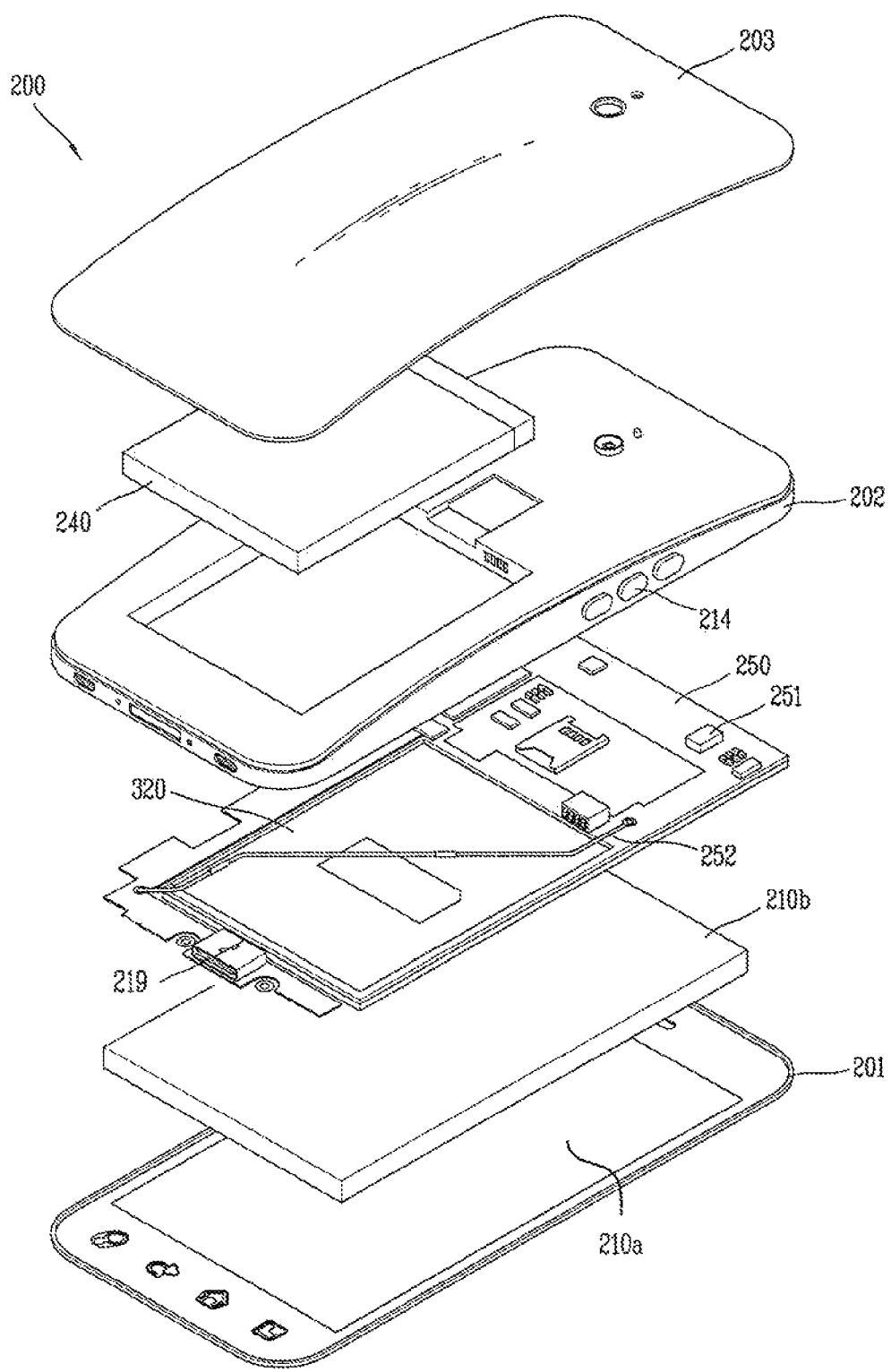
FIG. 4 is a disassembled perspective view of FIG. 3.

FIG. 4 is a disassembled perspective view of FIG. 3.

Referring to FIG. 4, the mobile terminal comprises a window 210*a* and a display module 210*b* which constitute the display unit 210. The window 210*a* may be coupled to one surface of the front case 201.

A frame 320 configured to support electric devices, is formed between the front case 201 and the rear case 202. The frame 320 configured to support inside of the mobile terminal, supports one of the display module 210*b*, the rear camera 221, an antenna device 300 and a circuit board 250.

The frame 320 may be formed such that part thereof is exposed to outside. The frame 320 may constitute part of a sliding module which connects a body portion and a display portion to each other in a slide type mobile terminal rather than a bar type mobile terminal.

Referring to FIG. 4, the circuit board 250 is disposed between the frame 320 and the rear case 202, and the display module 210*b* is coupled to one surface of the frame 320. The circuit board 250 and the battery are disposed on another surface of the frame 320, and a battery case 203 for covering the battery may be coupled to the rear ease 202. FIG. 4 also illustrates the socket 219.

The window 210*a* is coupled to one surface of the front case 201. A touch sensor (not shown) may be mounted to the window 210*a*. The touch sensor is configured to sense a touch input, and is formed of a transmissive material. The touch sensor is mounted to a front surface of the window 210*a*, and is configured to convert a change of a voltage, etc. occurring on a specific part of the window 210*a*, into an electric input signal.

The display module 210*b* is mounted to a rear surface of the window 210*a*. In this embodiment, the display module 210*b* is implemented as a thin film transistor-liquid crystal display (TFT-LCD). However, the present invention is not limited to this.

For instance, the display module 210*b* may be implemented as a liquid crystal display (LCD), an organic light-emitting diode (OLED), a flexible display, a 3D display, etc.

The circuit board 250 may be formed on one surface of the frame 320 as aforementioned, but may be mounted below the display module 210*b*. One or more electronic devices are mounted to a lower surface of the circuit board 250.

A battery accommodation portion for accommodating the battery 240, is recessed from the frame 320. A contact terminal connected to the circuit board 250 so that the battery 240 can supply power to the terminal body, may be formed on one side surface of the battery accommodation portion.

An antenna device 300 (see FIGS. 6A and 6B, for example) may be formed on an upper or lower end of the mobile terminal. Alternatively, the antenna device 300 may be formed in plurality, and the plurality of antenna devices 300 may be disposed on the upper end and the lower end of the mobile terminal, respectively. In this case, the antenna devices 300 may be configured to transmit and receive (transmit) radio signals in different frequency bands.

The frame 320 may be formed of a metallic material for high intensity despite its small thickness. The frame 320 formed of a metallic material may operate as a ground. That is, the circuit board 250 or the antenna device 300 may be ground-connected to the frame 320, and the frame 320 may operate as a ground of the circuit board 250 or the antenna device 300. In this case, the frame 320 may extend a ground of the mobile terminal.

The circuit board 250 is electrically connected to the antenna device 300, and is configured to process radio signals (or radio electromagnetic waves) transceived by the antenna device 300. For processing of radio signals, a plurality of transceiver circuits 251 may be mounted to the circuit board 250.

The transceiver circuits 251 may include one or more integrated circuits and related electric devices. For instance, the transceiver circuits may include a transmission integrated circuit, a reception integrated circuit, a switching circuit, an amplifier, etc.

As the plurality of transceiver circuits simultaneously feed conductive members serving as radiators, the plurality of antenna devices may simultaneously operate. For instance, while one of the transceiver circuits performs a transmission function, another thereof may perform a reception function. Alternatively, both of the transceiver circuits may perform a transmission function or a reception function.

Figure 5A:
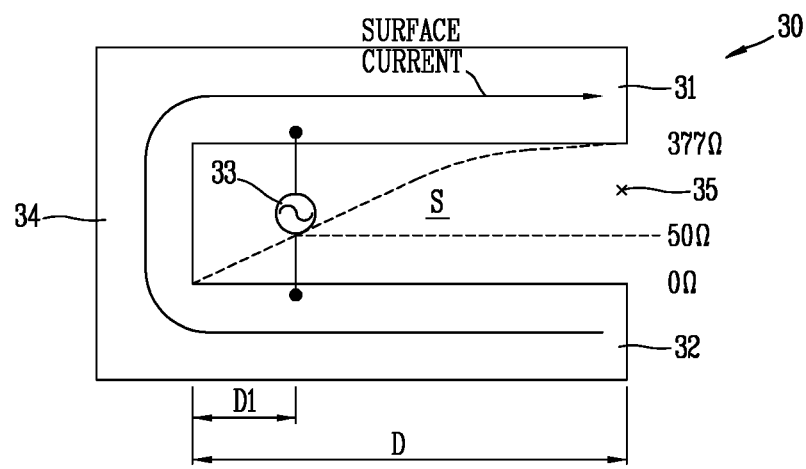
FIGS. 5A and 5B are conceptual views showing antenna devices according to comparative embodiments of the present invention.
Figure 5B:
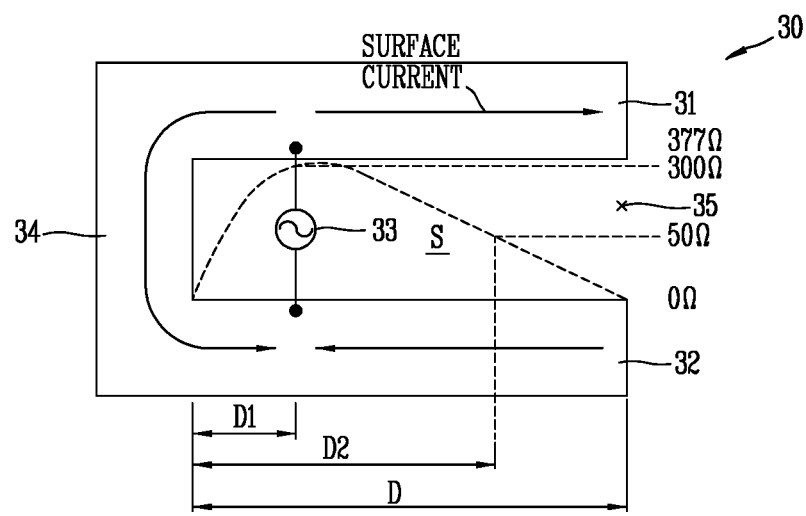
Figure 5C:
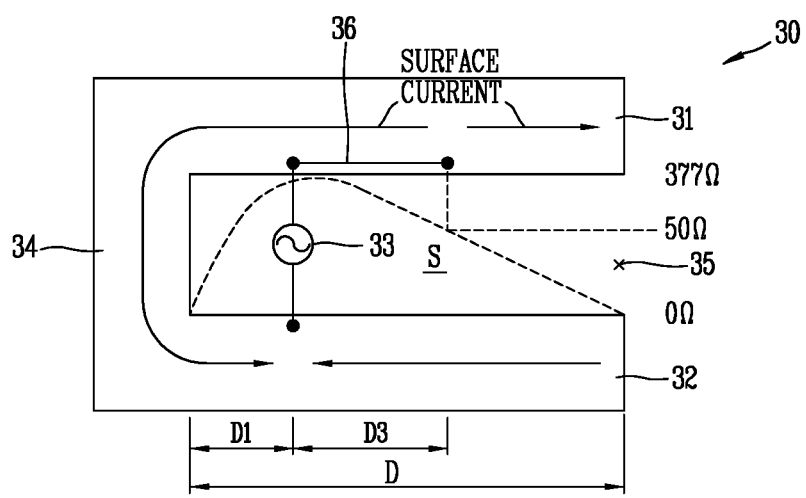
FIG. 5C is a conceptual view of an antenna device according to an embodiment of the present invention.

FIGS. 5A and 5B are conceptual views showing antenna devices according to comparative embodiments of the present invention, and FIG. 5C is a conceptual view of an antenna device according to an embodiment of the present invention.

The antenna devices according to comparative embodiments are antennas transformed from a slot antenna, which is configured to transceiver radio signals while resonating in a plurality of frequency bands. Generally, a slot antenna has a structure that a slot is formed on a wall surface of a wave guide, a surface of a cylindrical conductor, or a planar conductor plate, and the slot is fed so that an electric field can be formed in the slot. Under such configuration, the slot antenna operates as a radiator. Such general slot antenna has been used to process radio signals in a single frequency band, rather than in a plurality of frequency bands. The reason will be explained with reference to FIGS. 5A and 5B.

FIGS. 5A and 5B are a first comparative embodiment and a second comparative embodiment of the present invention, which show a slot antenna 30 having one open side, respectively. The slot antenna 30 is configured to resonate in a low frequency band, with a shorter slot length (D) than a slot antenna having two closed sides, due to a mirror effect. That is, the slot antenna having one open side can resonate in the same frequency band, with a length corresponding to about ½ a length of a slot antenna having two closed sides.

In case of a slot antenna having two closed sides, a slot has a length corresponding to $\lambda/2$ with respect to a wavelength of a center frequency of a first frequency band, in order to radiate radio waves in the first frequency band. In case of a slot antenna having one open side, a slot has a length corresponding to $\lambda/4$ with respect to a wavelength of a center frequency. That is, the slot antenna having one open side can have a minimized size, because it can radiate radio waves corresponding to radio signals in a low frequency band, with a slot of a shorter length.

FIG. 5A illustrates a relation between an impedance and a current when the slot antenna 30 radiates radio waves in a first frequency band. Here, the dotted line indicates the size of an impedance, and the arrow indicates a current flowing along the slot.

A first member 31 and a second member 32 form a slot (S).

A length (D) of the slot (S) corresponds to $\lambda/4$ with respect to a wavelength of a center frequency of a first frequency band. An impedance of the antenna device, by which radio waves radiate, has a value about 377 ohm, and impedance matching is performed at one open side 35 of the slot. Since impedance matching of an antenna is performed at about 50 ohm, a feeding portion 33 is spaced from one closed side 34 by a prescribed distance (D1).

FIG. 5B illustrates an impedance and a current flow when radio waves radiate in a second frequency band by the antenna of FIG. 5A. The length (D) of the slot corresponds to $\lambda/2$ with respect to a wavelength of a center frequency of a second frequency band. An impedance of the antenna device where radio waves radiate has a value about 377 ohm, and impedance matching is performed at a central part of the slot in a lengthwise direction.

Unless the feeding portion 33 has a displacement, the position of the feeding portion 33 in a first frequency band for impedance matching, corresponds to a position where an impedance of about 300 ohm can be implemented in a second frequency band. On the contrary, an impedance matching position (D2) in a second frequency band is spaced from a closed part of the slot by a prescribed length.

Accordingly, if the position of the feeding portion 33 is not changed, it is difficult to perform impedance matching for allowing the slot antenna to have efficiency more than a prescribed value in a second frequency band.

That is, if the feeding portion 33 is positioned in a first frequency band for impedance matching, it is difficult to perform impedance matching in a second frequency band. Therefore, an antenna performance satisfied in a second frequency band cannot be obtained.

In order to solve such problem, there is provided an antenna device according to an embodiment of the present invention as shown in FIG. 5C. Referring to FIG. 5C, the antenna device is provided with a feeding extension portion 36 extending from the feeding portion 33.

The feeding extension portion 36 extends from the feeding portion 33 so that an impedance can be about 50 ohm, in a case where the slot antenna operates in a second frequency band. That is, the feeding portion 33 is displaced at a position where an impedance is 50 ohm, in a case where the slot antenna operates in a first frequency band. The feeding extension portion extends from the feeding portion 33 by a prescribed length (D3) so that an impedance can be 50 ohm, in a case where the slot antenna operates in a second frequency band.

The antenna device according to the present invention can have impedance matching so that antenna efficiency more than a prescribed value can be implemented in a plurality of frequency bands, without using a balun or a diplexer.

Figure 6A:
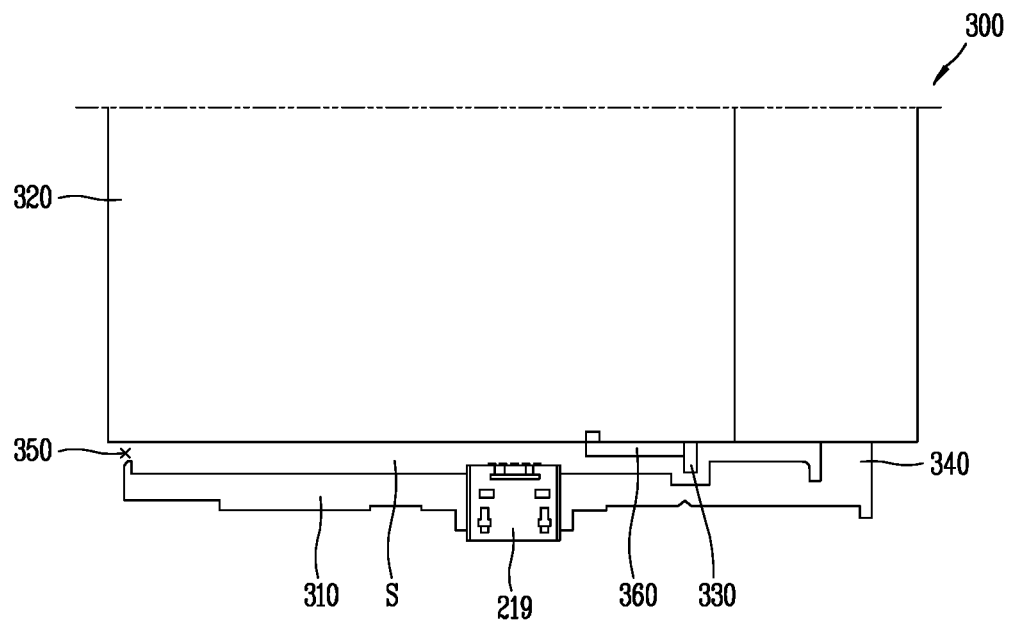
FIG. 6A is a conceptual view showing an antenna device of a mobile terminal according to a first embodiment of the present invention.
Figure 6B:
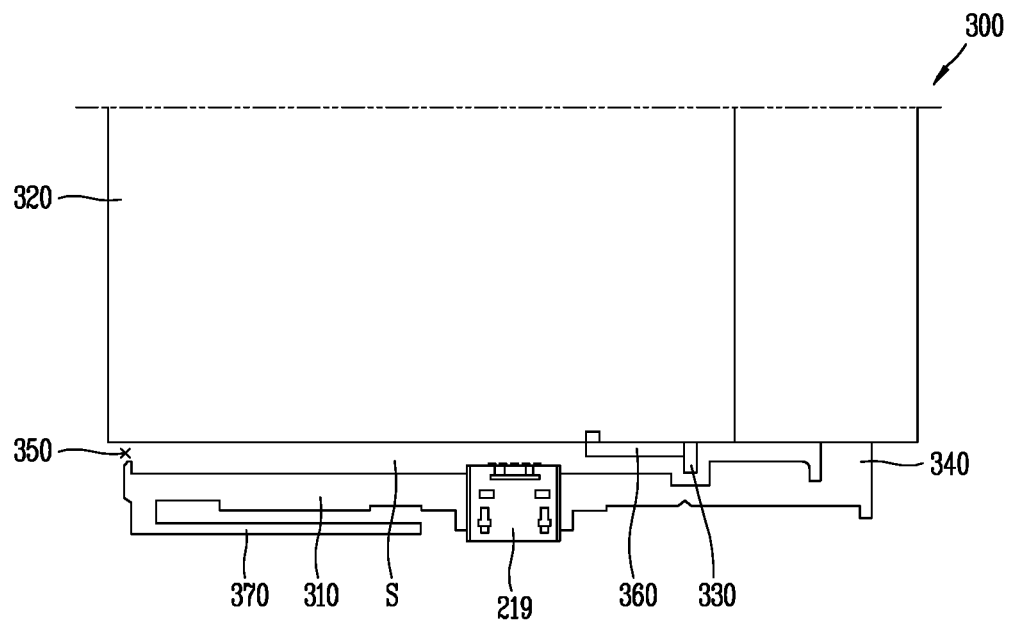
FIG. 6B is a conceptual view showing an example where a stub has been added to the antenna device of FIG. 6A.
Figure 6C:
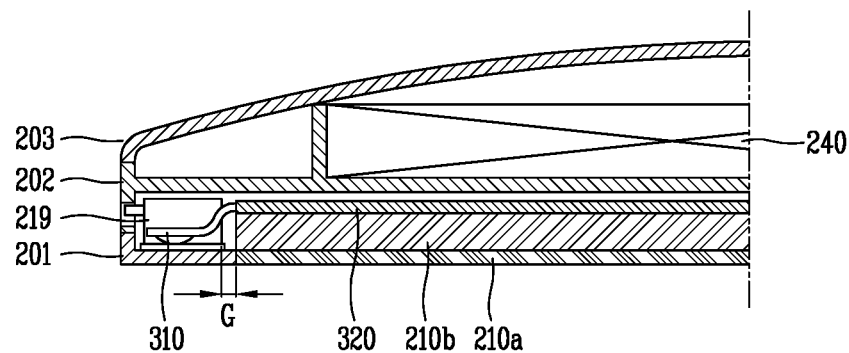
FIG. 6C is a view showing voltage standing wave ratios (VSWR) of the antenna devices of FIGS. 6A and 6B.

FIG. 6A is a conceptual view showing an antenna device of a mobile terminal according to a first embodiment of the present invention, FIG. 6B is a conceptual view showing an example where a stub has been added to the antenna device of FIG. 6A, and FIG. 6C is a view showing voltage standing wave ratios (VSWR) of the antenna devices of FIGS. 6A and 6B.

As shown in FIG. 6A, the antenna device 300 comprises a first member 310, a second member 320, a feeding portion 330 and a feeding extension portion 360.

Each of the first member 310 and the second member 320 may be configured as a conductive member, and the first member 310 and the second member 320 define a slot (S) of the antenna device 300. That is, a space between the first member 310 and the second member 320 serves as a slot (S) of the antenna device. An open part of the slot (S) is called an opening 350. A closed part of the slot (S), due to connection between the first member 310 and the second member 320, is called a connector 340.

A length from the opening 350 to the connector 340 of the slot (S) corresponds to $\lambda/4$ or $\lambda/8$ with respect to a wavelength of a center frequency of a first frequency band. The length of the slot (S) may be changed by an antenna feeding method, a dielectric constant of a dielectric substance of the antenna, or addition of a capacitor of the feeding portion. For instance, in a case where the antenna device operates in a $\lambda/4$ resonance mode due to change of a feeding method, the length of the slot may correspond to λ/4 with respect to a center frequency. For a smaller size of the antenna device 300, the slot (S) may be bent, or the slot (S) may have a meander structure.

For instance, in case of a communication service bandwidth where a first frequency band corresponds to GSM 850, the slot (S) is formed to have a length of about 45-53 mm. In case of a communication service bandwidth where a first frequency band corresponds to LTE 700, the slot (S) is formed to have a length of about 50-60 mm. Considering efficiency of the antenna device, the width of the slot (S) is required to be at least 0.003λ.

Each of the first member 310 and the second member 320 has only to be formed of a conductive material. In this embodiment, the first member 310 is implemented as a flexible printed circuit board having a ground, and the second member 320 is implemented as a frame for supporting inside of the mobile terminal.

The feeding portion 330 feeds the slot antenna so that the antenna device can resonate at a specific frequency. More specifically, one end of the feeding portion 330 may be connected to one member of the slot so that the feeding portion 330 can form an electric field in the slot (S).

The feeding portion and the members may be wholly or partially connected to each other according to a feeding method.

According to a direct feeding method, the feeding portion extending from a coaxial cable 252 (refer to FIG. 4) may extend from one member to another member so as to cross the slot (S). That is, according to a direct feeding method, one end of the feeding portion may be connected to one member, and another end of the feeding portion may extend to be connected to another member.

According to a coupling feeding method, one end of the feeding portion may be connected to one member, and another end thereof may be spaced from another member.

Referring to FIG. 6A, the feeding portion 330 extends from the second member 320 toward the first member 310. According to a coupling feeding method, one end of the feeding portion 330 is connected to the second member 320, and another end of the feeding portion 330 is spaced from the first member 310.

As shown in FIG. 5C, the feeding portion 330 is spaced from the connector 340 by a prescribed distance, so that an impedance of a center frequency of a first frequency band can be about 50 ohm by the feeding portion 330. The feeding portion 330 may comprise a shunt element implemented having a capacitor or an inductor for impedance matching. The shunt element may control a resistance, a real number part of an impedance. For instance, an inductor may be controlled to have a high resistance, but a capacitor may be controlled to have a low resistance to thus perform impedance matching. The shunt element may be implemented as a lumped constant element on one end of the feeding portion.

The feeding extension portion 360 extends from the feeding portion 330 by a prescribed distance, so that an impedance of a center frequency of a second frequency band can be within 50 ohm by the feeding extension portion 360, and so that the impedance of the center frequency of the second frequency band can be within 50 ohm in a case where the antenna device comprises a third member. The length of the feeding extension portion 360 may be properly controlled for impedance matching so that the antenna device 300 can effectively operate. The feeding extension portion 360 may comprise a series element having a capacitor or an inductor for impedance matching. The series element may control a reactance, an imaginary number part of an impedance. For instance, an inductor may be controlled to have a high reactance, but a capacitor may be controlled to have a low reactance to thus perform impedance matching. The series element may be implemented as a lumped constant element at part of the feeding extension portion 360. That is, a series capacitor may be disposed on one end of the feeding extension portion, or a series inductor may be disposed at part of the feeding extension portion.

In case of comprising a shunt element or a series element, the antenna device may have a more enhanced performance by changing the length or shape of the slot.

For instance, in a case where a shunt capacitor is disposed at the feeding portion 330 and a series capacitor is disposed at the feeding extension portion 360, the length of the slot may be formed to correspond to about λ/8 with respect to a wavelength of a center frequency of a first frequency band, due to lowered resistance and reactance. Due to the shortened length of the slot, the antenna device can be minimized.

The feeding extension portion 360 may be coupled to one surface of the second member 320. A dielectric substance may be disposed between the feeding extension portion 360 and the second member 320. As the dielectric substance, FR-3 and CEM-1 may be used. The FR-3 is made of multiple plies of paper that have been impregnated with an epoxy-resin binder, and the CEM-1 is a composite material that has a paper core impregnated with epoxy resin. Alternatively, the dielectric substance may be implemented as CEM-3, FR-4, FR-5 or GI. The CEM-3 impregnated with epoxy resin has woven glass cloth surfaces, and a core of non-woven matte fiberglass. The FR-4 is constructed on multiple plies of epoxy-resin impregnated woven glass cloth. The FR-5 is constructed on multiple plies of reinforced epoxy-resin impregnated woven glass cloth. The GI is constructed on multiple plies of polyimide-resin impregnated woven glass cloth. Alternatively, the to dielectric substance may be implemented as a printed circuit board (PCB).

As shown in FIG. 6A, the feeding extension portion 360 may be coupled to one surface of the second member 320. As shown in FIG. 5C, the feeding extension portion 360 may extend from the feeding portion 330 so that an impedance can be about 50 ohm, in a case where the slot antenna operates in a second frequency band.

However, as explained later, in a case where the antenna device comprises a third member, an additional resonance occurs from a third frequency band, resulting in enhancing impedance at a second frequency band. Accordingly, the feeding extension portion may extend from the feeding portion so that an impedance can be about 150 ohm (refer to FIG. 5C) in a second frequency band.

In a case where a center frequency of a second frequency band is about 1900 MHz, the feeding extension portion 360 extending from the feeding portion may be formed to have a length of 8~13 mm. Such length of the feeding extension portion 360 may be increased or decreased by an electromagnetic influence from other components of the antenna device. An insulator or a dielectric substance may be disposed between the feeding extension portion 360 and the second member 320.

Unlike the aforementioned case where the feeding extension portion 360 is coupled to one surface of the second member 320, the feeding extension portion 360 may be spaced from the second member to extend in parallel to the second member. This will be explained in the following embodiments shown in FIGS. 7B to 7D. If the feeding extension portion is spaced from at least one member to thus extend in parallel to the member, a capacitive coupling occurs between the feeding extension portion and the member. As such capacitive coupling changes a capacitance of the antenna device, the interval between the feeding extension portion and the member which are disposed in parallel, or the length of the feeding extension portion can be controlled for control of antenna characteristics. If the feeding extension portion is formed so that such capacitive coupling can be generated, the length of the feeding extension portion may be shorter than that in the embodiment shown in FIG. 6A.

Referring to FIG. 6B, the antenna device 300 may further comprise a third member 370, as well as the first member 310, the second member 320, the feeding portion 330 and the feeding extension portion 360.

Since radiation in a second frequency band occurs at a central part of the slot (S), rather than at the opening 350 of the slot (S), antenna efficiency may be lowered in a second frequency band due to the peripheral devices. Accordingly, the antenna device 300 may further comprise a third member 370 so as to resonate at a third frequency adjacent to the second frequency band. The third member 370 is a sort of stub.

The third member 370 may be implemented as a conductive member, and may extend from one of the first member 310 and the second member 320. For instance, the third member 370 may extend from the first member 310. As shown in FIG. 6B, the third member 370 may be formed in a prescribed length as part thereof is bent in parallel to the first member 310. The third member 370 may be formed to have a length corresponding to λ/4 with respect to a wavelength of a third frequency. The length of the third member 370, which is from one end connected to other member to another end, corresponds to a third frequency. When the third frequency is 2100 MHz, the length of the third member 370 is preferably about 20~25 mm. The length of the third member may be increased or decreased during an antenna tuning process. For instance, when an inductor serving as a series element is added to part of the third member, the length of the third member may be shortened. If the length of the third member is shortened, interference on other antennas mounted in the mobile terminal having a plurality of antennas can be reduced.

The upper graph (REF 1) of FIG. 6C illustrates a voltage standing wave ratio (VSWR) according to a frequency of the antenna device of FIG. 6A. As shown, a good antenna performance is implemented at a first frequency band, even if a bandwidth is a little narrow. However, the voltage standing wave ratio (VSWR) is about 8 at a second frequency band, which indicates that antenna efficiency is lower in the second frequency band than in the first frequency band.

The lower graph (REF 2) of FIG. 6C illustrates a voltage standing wave ratio (VSWR) according to a frequency of the antenna device comprising a third member shown in FIG. 6B.

Like the antenna device of FIG. 6B, the antenna device may further comprise a third member 370 so as to resonate at a third frequency adjacent to a center frequency of a second frequency band. If the center frequency of the second frequency band is about 1900 MHz, the third member 370 may be formed so that a third frequency can be about 2100 MHz. Under such configuration, as shown in the lower graph (REF 2) of FIG. 6C, the antenna device additionally resonates at the third frequency. Accordingly, the antenna device may form a wide bandwidth in a high frequency band including the center frequency of the second frequency band and the third frequency.

In a case where the antenna device further comprises the third member 370, an additional resonance occurs in a third frequency band, and thus an impedance is enhanced in a second frequency band. Accordingly, the feeding extension portion 360 may extend from the feeding portion so that an impedance can be about 150 ohm in a second frequency band.

That is, the antenna device has a margin of impedance matching. More specifically, it is preferable that an impedance is about 50 ohm in a second frequency band. However, even if an impedance is about 150 ohm in a second frequency band, the antenna device can implement a prescribed antenna performance. Therefore, the antenna device further comprises the third member so as to have a margin of impedance matching of about 50~150 ohm in a second frequency band.

Figure 6D:
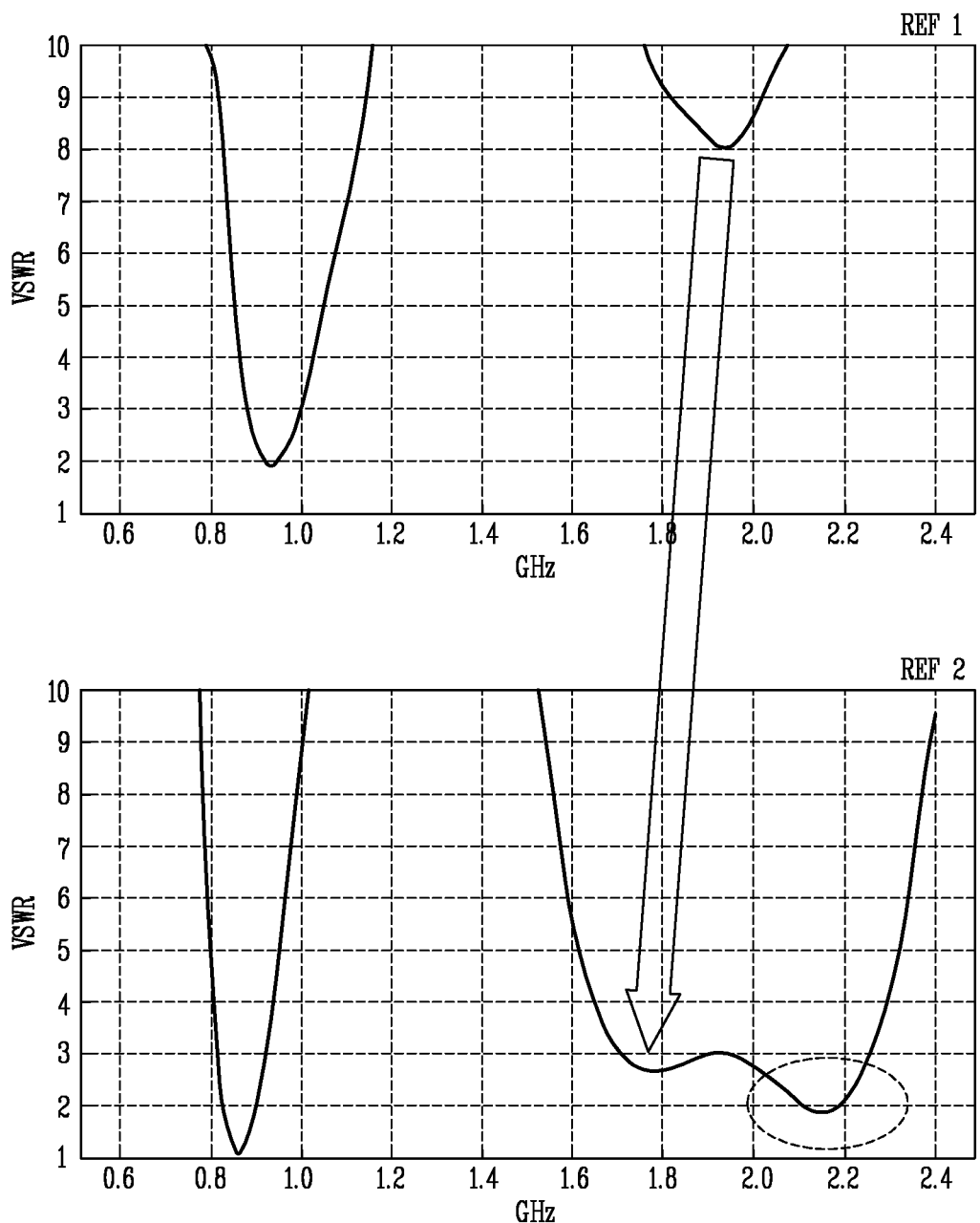
FIG. 6D is a sectional view taken along line IV-IV in FIG. 2, which shows a mobile terminal having an antenna device shown in FIG. 6A.

FIG. 6D is a sectional view taken along line IV-IV in FIG. 2, which shows the mobile terminal having the antenna device shown in FIG. 6A.

In the mobile terminal having therein a monopole type, a PIFA type or a folded dipole type antenna, members of the antenna are spaced from other electric devices. The reason is in order to prevent lowering of antenna efficiency, the lowering resulting from that an electromagnetic characteristic is variable due to the electric devices disposed close to the antenna device. That is, the mobile terminal needs to be provided with an inner space of a prescribed volume for mounting an antenna device therein. In the conventional art, it was difficult to design a mobile terminal, because the mobile terminal should have a sufficient inner space for mounting an antenna device therein.

However, in the present invention, the mobile terminal is provided with an antenna device 300 transformed from a slot antenna. The antenna device 300 of the present invention has enhanced efficiency in a plurality of frequency bands. Further, even if electric devices are disposed near conductive members of the antenna device 300, performance of the antenna device 300 is not lowered. The reason is because one of members of the antenna device 300 operates as a ground of the mobile terminal. Another reason is because electromagnetic waves radiate at one open side of the slot (S) in case of radio signals in a first frequency band. Under such configuration, the mobile terminal does not require an inner radiation space, when compared with other types of antennas according to preferred embodiments of the present invention. As a result, the terminal body can be made to be slimmer. Further, as shown in FIG. 6D, a mobile terminal, which has a peculiar design that an antenna mounting part is slimmer than other parts (e.g., display or battery mounting part), can be implemented. That is, the mobile terminal can be configured to have its thickness reduced toward its upper or lower part. As aforementioned, the antenna device of the present invention can implement a sufficient antenna performance without being influenced by other electric devices, even if it is formed in a small space.

As shown in FIG. 6A, the first member 310 may comprise a socket 219 to which an external device is electrically connected. Even if a member which defines a slot (S) includes other electric connection parts, the antenna device can maintain a performance more than a prescribed value. This can allow the mobile terminal to be designed in a more free manner. Further, as the respective components can be integrated with each other, the mobile terminal can be more minimized.

An inner space of the mobile terminal according to the present invention can be utilized more efficiently. Referring to FIGS. 4 and 6A, the first member 310 serves to electrically connect keys of the user input unit of the mobile terminal, with a circuit board 350. Keys are arranged on one surface of the first member 310, and a display 310b is arranged on one surface of the second member 320. The keys and the display 310b are formed in a prescribed volume, and are formed as a plurality of components are assembled to each other. In a case where a plurality of components are assembled to each other, the components are required to have a spacing distance therebetween for a margin space due to an assembly tolerance or a dimensional tolerance.

The keys and the display 310b may be spaced from each other in a lengthwise direction for a tolerance (allowance) between components, and for a user's manipulating the display with viewing the display. Under such configuration, a gap (G) is formed between the first member 310 and the second member 320 (refer to FIG. 6D).

In the present invention, such gap is utilized as the slot (S) of the antenna device 300. That is, in the present invention, the slot (S) of the antenna device 300 is formed at a gap required in the mobile terminal due to a tolerance. Accordingly, the inner space of the mobile terminal can be utilized in a more efficient manner.

Hereinafter, the same or similar configurations as/to those aforementioned in FIGS. 7A to 11 will not be explained, but only a different configuration will be explained.

FIGS. 7A to 7F are views showing modification examples of the antenna device of FIG. 6A.

Figure 7A:
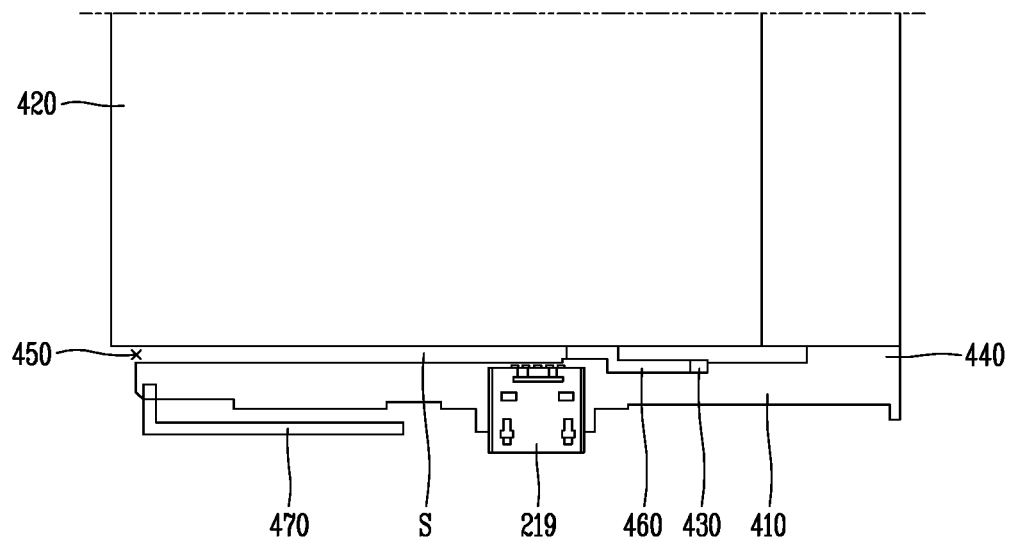
FIGS. 7A to 7F are views showing modification examples of the antenna device of FIG. 6A.

The antenna device of FIG. 7A comprises a first member 410 and a second member 420. The first member 410 and the second member 420 form a slot (S) of the antenna device. A feeding portion 430 is coupling-fed toward the second member 420 from the first member 410. A feeding extension portion 460 is formed on the first member 410, and is bent from one point to extend in parallel to the second member 420. The extended one end of the feeding extension portion 460 is ground-connected to the second member 420. The feeding extension portion 460 may be formed on one surface of one of the first member 410 and the second member 420 which form the slot (S), or may extend in parallel to one member. One part of the feeding extension portion 460 may be spaced from one member in parallel, and another part of the feeding extension portion 460 may be coupled to one surface of another member.

Such modification embodiment is advantageous in a case where it is difficult to form the feeding extension portion 460 at the second member 420. In this embodiment, the antenna device can resonate at a plurality of frequency bands due to the feeding extension portion 460. Further, the antenna device can implement an antenna performance even in a high frequency band with a wide bandwidth.

Figure 7B:
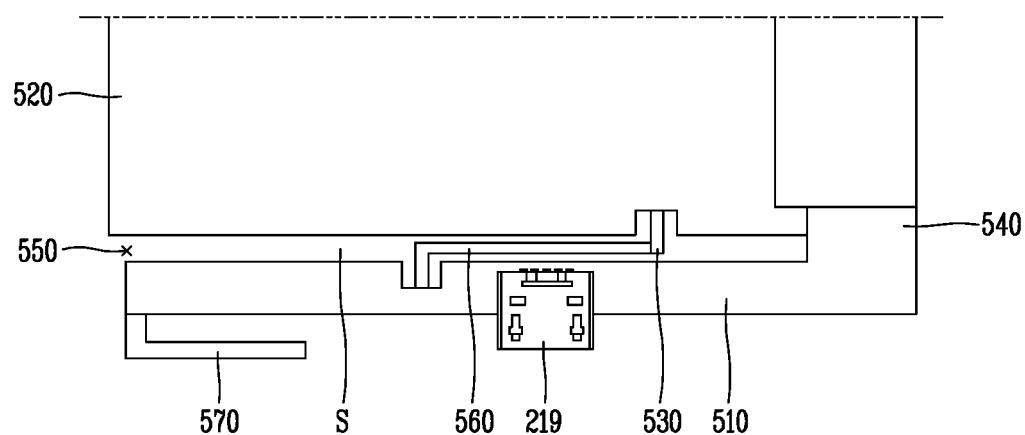

The antenna device of FIG. 7B comprises a first member 510 and a second member 520. The first member 510 and the second member 520 form a slot (S) of the antenna device. A feeding portion 530 extends toward the first member 510 from the second member 520. A feeding extension portion 560 is formed to have a prescribed length, and is spaced from the first member 510 and the second member 520 along the slot (S). One end of the feeding extension portion 560 is ground-connected to the first member 510. Such feeding method to form the feeding extension portion 560 between the first member 510 and the second member 520, increases a capacitance value of the antenna device. As an input impedance by a capacitance is in inverse proportional to a frequency, a resonance frequency of the antenna device is reduced. Therefore, such embodiment is advantageous in a case where the antenna device is implemented in a lower frequency band without increasing the length of the slot (S).

Figure 7C:
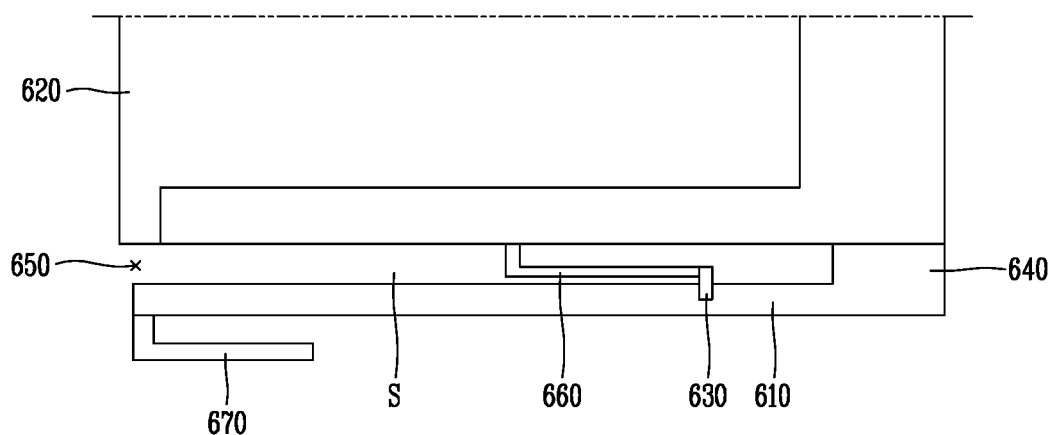

An antenna device of FIG. 7C comprises a first member 610 and a second member 620. The first member 610 and the second member 620 form a slot (S) of the antenna device. A feeding portion 630 extends toward the second member 620 from the first member 610. A feeding extension portion 660 is formed to have a prescribed length, and is spaced from the first member 610 and the second member 620 along the slot (S).

One end of the feeding extension portion 660 is ground-connected to the second member 620. Such feeding method to form the feeding extension portion 660 between the first member 610 and the second member 620, increases a capacitance value of the antenna device. As an input impedance by a capacitance is in inverse proportional to a frequency, a resonance frequency of the antenna device is reduced. Therefore, such embodiment is advantageous in a case where the antenna device is implemented in a lower frequency band without increasing the length of the slot (S).

Figure 7D:
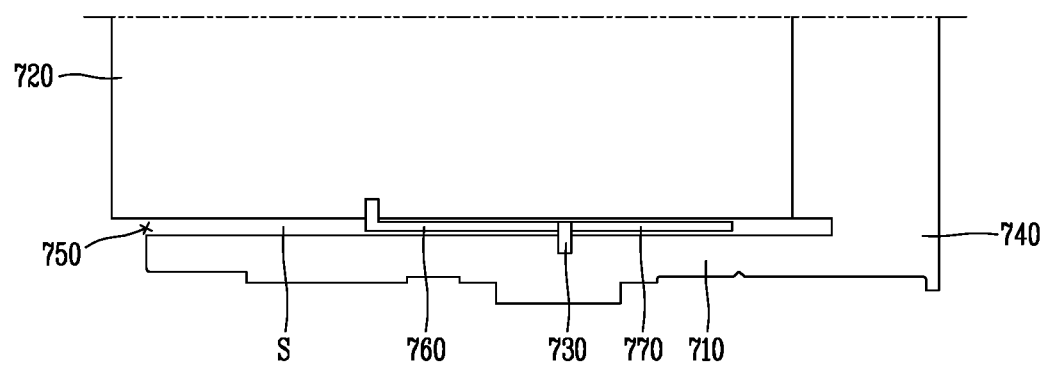

An antenna device of FIG. 7D comprises a first member 710 and a second member 720. The first member 710 and the second member 720 form a slot (S) of the antenna device. A feeding portion 730 extends toward the second member 720 from the first member 710. A feeding extension portion 760 is bent from the feeding portion 730, and extends toward an opening 750 with a prescribed length. The feeding extension portion 760 is spaced from the first member 710 and the second member 720 along the slot (S). One end of the feeding extension portion 760 is bent to be ground-connected to the second member 720.

The part, which is bent from the feeding portion 730 to thus extend toward a connection part 740, may operate as a stub serving as a third member 770. Unlike in the aforementioned embodiment, the third member 770 may extend between the first member 710 and the second member 720, in parallel thereto. Under such configuration, the antenna device can be implemented in a smaller area.

Figure 7E:
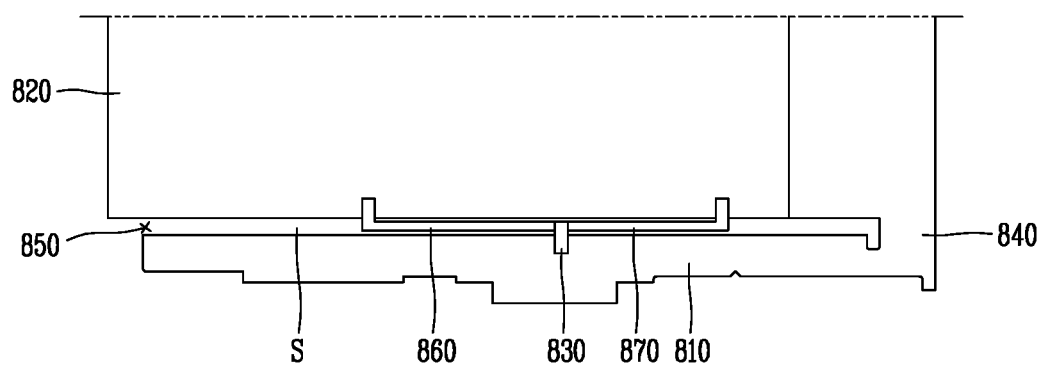

An antenna device of FIG. 7E comprises a first member 810 and a second member 820. The first member 810 and the second member 820 form a slot (S) of the antenna device. A feeding portion 830 extends toward the second member 820 from the first member 810. A feeding extension portion 860 is bent from the feeding portion 830, and extends toward an opening 850 with a prescribed length. The feeding extension portion 860 is spaced from the first member 810 and the second member 820 along the slot (S). One end of the feeding extension portion 860 is bent to be ground-connected to the first member 510.

The part, which is bent from the feeding portion 830 to thus extend toward a connection part 840, may operate as a stub serving as a third member 870. One end of the third member 870 may be ground-connected to the second member 820.

Under such configuration, the antenna device can be tuned as impedance matching conditions are changed for a more enhanced antenna performance.

Figure 7F:
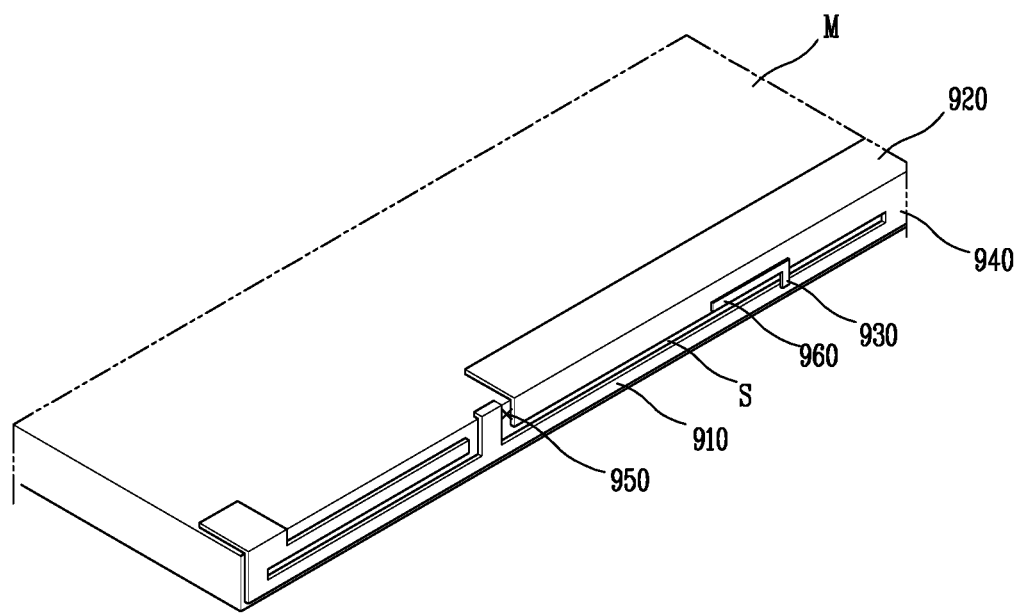

The antenna device shown in FIG. 7F comprises a first member 910 and a second member 920. The first member 910 and the second member 920 form a slot (S) of the antenna device on one side surface of a member (M). Such member (M) may be a component of the mobile terminal, e.g., a circuit board or a frame. A feeding portion 930 extends toward the second member 920 from the first member 910. A feeding extension portion 960 is bent from the feeding portion 930 toward an opening 950, and is formed to have a prescribed length. The feeding extension portion 960 is spaced from the first member 910 and the second member 920 along the slot (S). One end of the feeding extension portion 960 may be bent to be ground-connected to the second member 920.

Unlike in the aforementioned embodiments, the slot (S) is formed in a thickness direction of the member (M), not in a width direction. The antenna device can be more freely arranged in the mobile terminal with occupying a smaller space.

As shown, the antenna device may be formed on side surfaces of the member (M) in plurality.

Figure 8A:
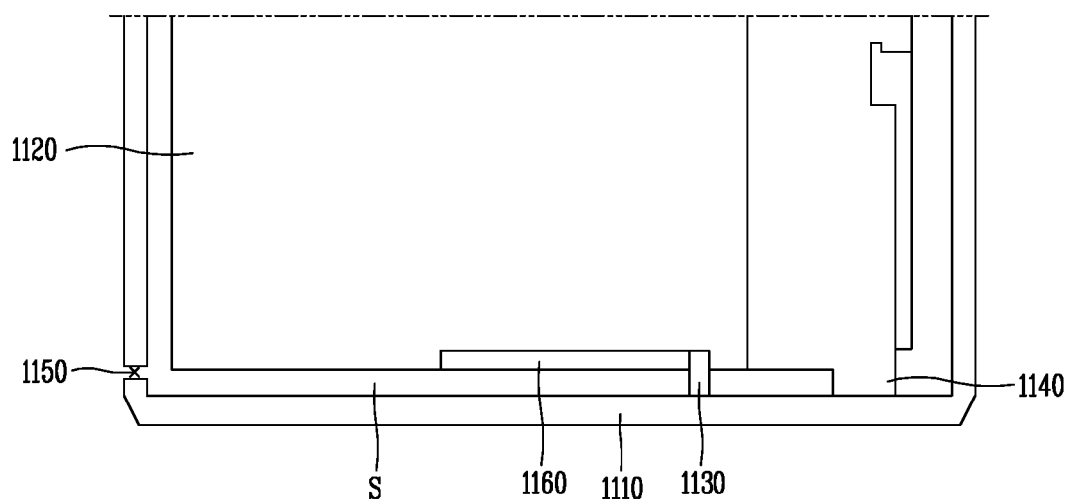
FIGS. 8A and 8B are conceptual views showing an antenna device of a mobile terminal according to a second embodiment of the present invention.
Figure 8B:
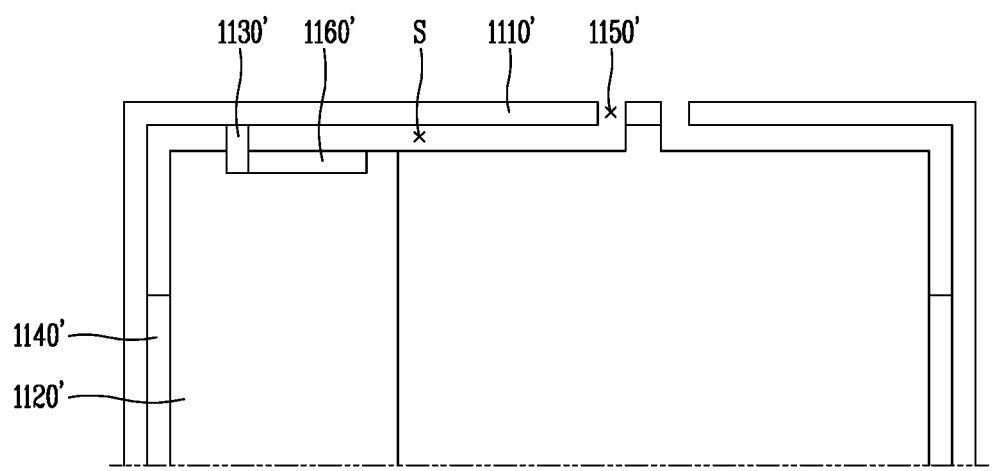

FIGS. 8A and 8B are conceptual views showing an antenna device of a mobile terminal according to a second embodiment of the present invention.

Referring to FIG. 8A, the antenna device comprises a first member 1110 and a second member 1120. The first member 1110 and the second member 1120 are spaced from each other, and form a slot (S) of which one side is open. The first member 1110 is part of a case which forms an appearance of the terminal body. The case may be a conductive member which forms a side appearance of the mobile terminal. The conductive member may be part of the front case 201 or the rear case 202.

The second member 1120 may be implemented as a frame for supporting inside of the mobile terminal. Alternatively, the second member 1120 may be implemented as a flexible printed circuit board (FPCB) for transmitting a signal generated from the user input unit to the controller, or an FPCB for transmitting a signal input and output from the socket 219 to the controller, the socket 219 mounted in the terminal body and connectable to an external device.

A feeding portion 1130 extends from the second member 1120 toward the first member 1110, thereby feeding the slot (S). A feeding extension portion 1160 extends from the feeding portion 1130 with a prescribed length.

Referring to FIG. 8B, an antenna device comprises a first member 1110' and a second member 1120'. The first member 1110' and the second member 1120' are spaced from each other, and form a slot (S) of the antenna device, the slot having one open side. As shown, the slot (S) extends from a connector 1140' to thus be bent at one point. Under such configuration, the length of the slot (S) can be prolonged in a smaller space, and thus the antenna device can be freely designed. That is, an antenna device, which is capable of transmitting and receiving a radio signal in a low frequency band within a limited space, can be implemented. Such antenna device may be formed in plurality.

The first member 1110' is part of a case which forms an appearance of the terminal body. The case may be a conductive member which forms a side appearance of the mobile terminal. The conductive member may be part of the front case 201 or the rear case 202.

The second member 1120' may be implemented as a frame for supporting inside of the mobile terminal. Alternatively, the second member 1120' may be implemented as a flexible printed circuit board (FPCB) for transmitting a signal generated from the user input unit to the controller, or an FPCB for transmitting a signal input and output from the socket 219 to the controller, the socket mounted in the terminal body and connectable to an external device.

A feeding portion 1130' extends from the second member 1120' toward the first member 1110', thereby feeding a slot (S). A feeding extension portion 1170' extends from the feeding portion 1130' with a prescribed length.

As shown in FIGS. 8A and 8B, as the conductive member which forms the appearance of the mobile terminal serves as a member of the antenna device, the mobile terminal may have an inner structure designed in a more compact manner.

Figure 9A:
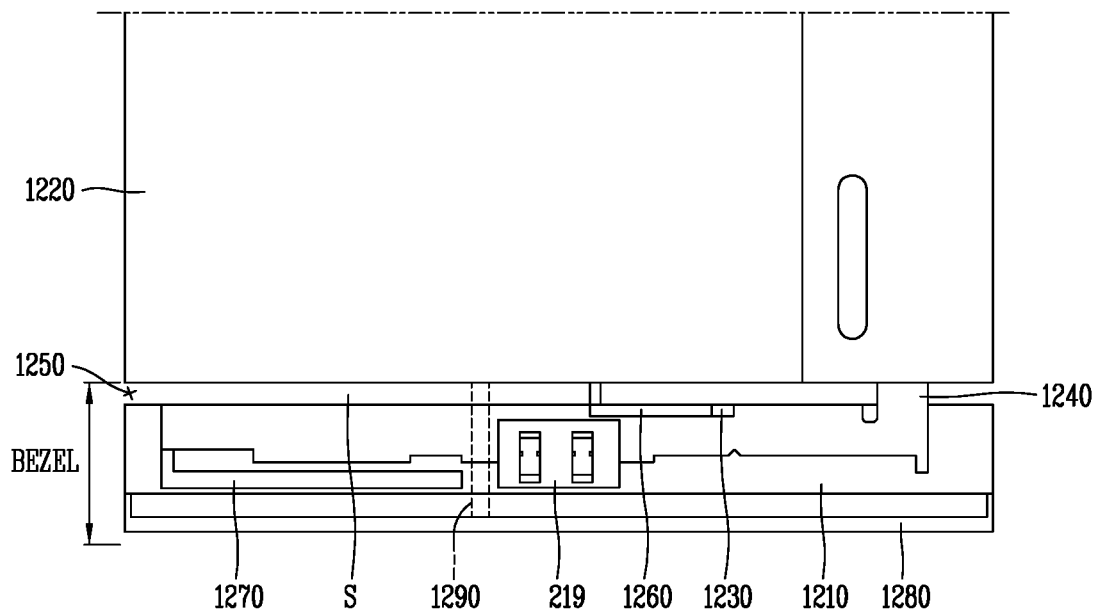
FIGS. 9A to 9C are conceptual views showing an antenna device of a mobile terminal according to a third embodiment of the present invention, and antenna devices according to comparative embodiments.
Figure 9B:
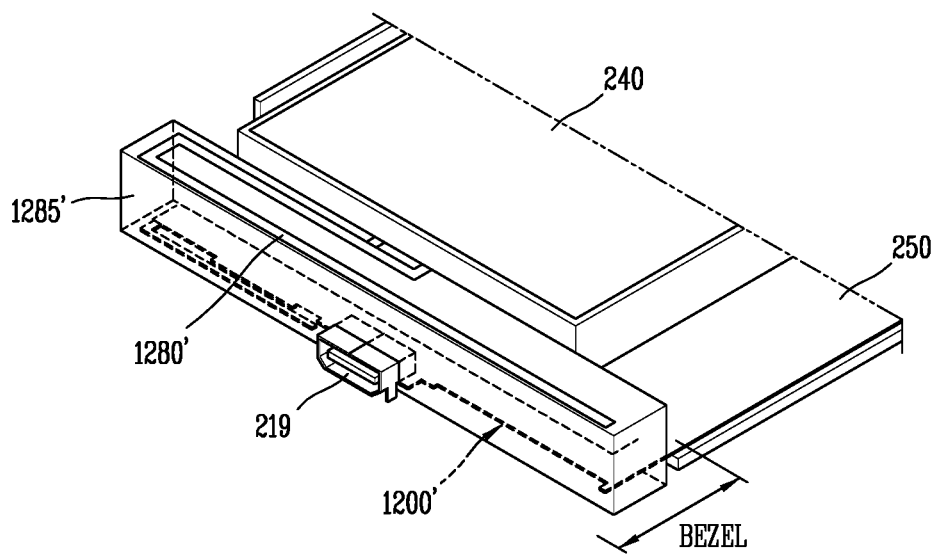
Figure 9C:
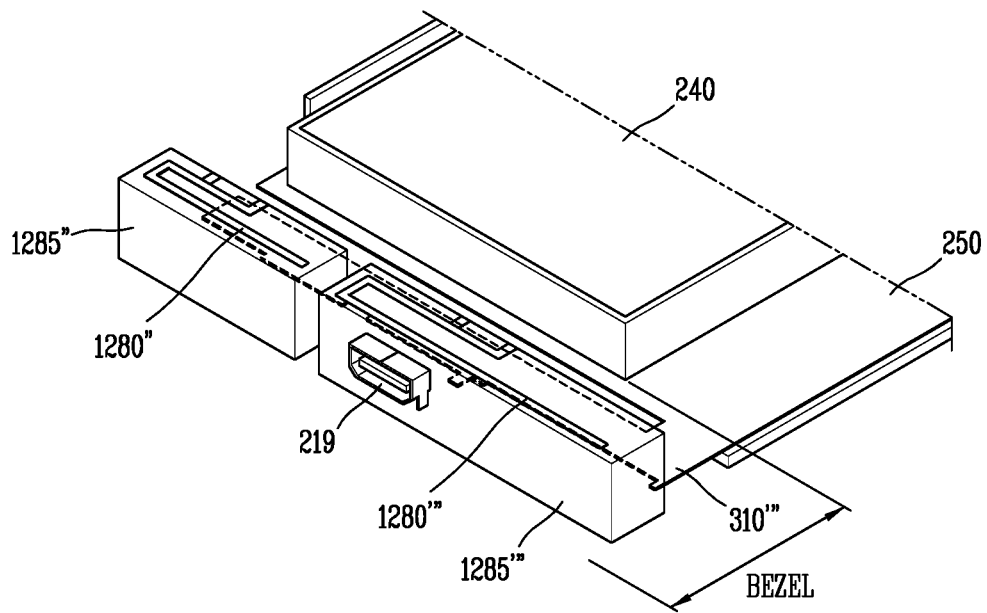

FIGS. 9A to 9C are conceptual views showing an antenna device of a mobile terminal according to a third embodiment of the present invention, and antenna devices according to comparative embodiments. In this embodiment, a plurality of antennas are formed. A first antenna device may operate as the aforementioned slot antenna, and a second antenna device may operate as a monopole type antenna, a dipole type antenna, or a PIFA type antenna.

As shown in FIG. 9A, a first member 1210 and a second member 1220 form a slot (S) of the antenna device. For instance, the first member 1210 may be implemented as a flexible printed circuit board (FPCB) for transmitting a signal generated from the user input unit to the controller. The second member 1220 may be implemented as a frame for supporting inside of the mobile terminal.

The first antenna device is fed by the feeding portion 1230 connected to a circuit board 1250 by a coaxial cable. A feeding extension portion 1260 extends from the first feeding portion 1230.

A fourth member 1280, which implements the second antenna device, is fed so that radio signals in a fourth frequency band can radiate. The fourth member 1280 may be implemented as a conductive case which forms an appearance of the terminal body. Feeding may be performed by a second feeding portion 1290 of which one end is connected to other coaxial cable which extends from a circuit board 1250 having a ground. Under such configuration, the fourth member 1280 may operate as a monopole type antenna or a dipole type antenna.

The first antenna device and the second antenna device are disposed close to each other, and are provided with grounds independent from each other. That is, a ground of the first antenna device serves as the second member 1220, and a ground of the second antenna device serves as the circuit board 1250. Under such configuration, the grounds of the first antenna device and the second antenna device can operate independently from each other.

When the mobile terminal is provided with a plurality of antennas, a problem, an antenna to antenna isolation, may occur. However, in this embodiment, the first antenna device and the second antenna device are configured to have different radiation directions. That is, the first antenna device has a first radiation direction, whereas the second antenna device has a second radiation direction perpendicular to the first radiation direction.

In the preferred embodiments of the present invention, even if a plurality of antenna devices operate as a MIMO or diversity system, the mobile terminal can reduce mutual coupling and an envelope correction coefficient between the first antenna device (main antenna of a transmitting side or a receiving side) and the second antenna device (sub antenna of a receiving side of the MIMO or diversity system).

In a case where at least one of a plurality of antenna devices mounted to the mobile terminal is a slot antenna according to the present invention, the plurality of antenna devices may be implemented in a smaller space than in the conventional mobile terminal. That is, in the preferred embodiments of the present invention, the first antenna device which operates as a slot antenna is disposed close to the second antenna device implemented as a monopole type, a dipole type, or a PIFA type, at a bezel portion of the mobile terminal. Alternatively, the first antenna device and the second antenna device may be laminated to each other as explained later. Here, the bezel portion indicates an inner space of the terminal body which extends from an outer portion of the display unit to the case of the mobile terminal.

Due to the characteristics of the slot antenna according to the preferred embodiment of the present invention, a bezel area of the terminal body can be reduced. As a result, a mobile terminal, which has a plurality of antenna devices of a smaller size and a compacter configuration, can be implemented.

FIG. 9B illustrates still another example where a plurality of antenna devices are mounted to a mobile terminal. A first antenna device 1200' may operate as the aforementioned slot antenna, and a second antenna device may operate as a monopole type antenna, a dipole type antenna or a PIFA type antenna.

The second antenna device may comprise a carrier 1285' and a conductive pattern 1280' formed on one surface of the carrier 1285'.

The second device is disposed to cover one surface of the first antenna device 1200'. That is, the first antenna device and the second antenna device are laminated on each other.

Due to the lamination structure of the antenna device, various types of mechanical parts inside the mobile terminal can be freely arranged, and the mobile terminal can be more minimized.

Since the first antenna device according to the present invention is not influenced by the peripheral mechanical parts, the mobile terminal can be designed in a free manner.

FIG. 9C shows an antenna device according to a comparative embodiment, in which each of the first antenna device and the second antenna device is implemented as a monopole type antenna, a dipole type antenna or a PIFA type antenna. Each of the first antenna device and the second antenna device may comprise a carrier 1285" and a conductive pattern 1280" formed on one surface of the carrier 1285".

Such antenna device should be spaced from electronic devices 250 and 310" because it is influenced by peripheral mechanical parts. In case of a plurality of antenna devices, the respective antenna devices should be spaced from electronic devices. This may cause a limitation to an inner space of the mobile terminal where the antenna devices are mounted. Further, design of the mobile terminal is restricted by the antenna device, and it is difficult to miniaturize the mobile terminal.

Unlike the antenna device of FIG. 9C, the antenna device of FIG. 9B scarcely has lowering of antenna efficiency due to peripheral electronic devices. Accordingly, the mobile terminal can be designed in a free manner.

Figure 10:
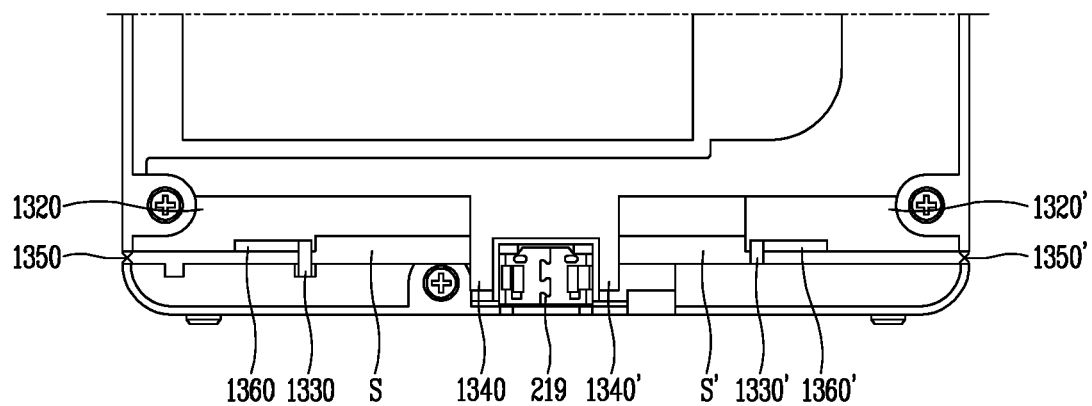
FIG. 10 is a conceptual view showing an antenna device of a mobile terminal according to a fourth embodiment of the present invention.

FIG. 10 is a conceptual view showing an antenna device of a mobile terminal according to a fourth embodiment of the present invention.

In the fourth embodiment, a mobile terminal is provided with a plurality of slot antennas. In an antenna device, a first slot (S) may be formed by a first member 1310 and a second member 1320, and a second slot (S) may be formed by a fourth member 1310' and a fifth member 1320'.

A third member 1370 may extend from one of the first member 1310, the second member 1320, the fourth member 1310' and the fifth member 1320'. The third member 1370 may operate as a device relating to impedance matching with respect to a slot antenna, and may operate as a device which causes resonance at another frequency.

A feeding portion 1330 is formed in plurality. More specifically, the feeding portion 1330 may comprise a first feeding portion 1330 for feeding a slot (S) formed by the first member 1310 and the second member 1320, and a second feeding portion 1330' for feeding a slot (S) formed by the fourth member 1310' and the fifth member 1320'. The first feeding portion 1330 is provided with a first feeding extension portion 1360, and the second feeding portion 1330' is provided with a second feeding extension portion 1360'.

The feeding extension portions 1360 and 1360' extend from the feeding portions 1330 and 1330', for impedance matching in correspondence to a center frequency of a high frequency band.

In this embodiment, a ground of a first slot antenna serves as the first member 1310, and a ground of a second slot antenna serves as the fourth member 1310'. Accordingly, the grounds of the respective antennas may be implemented independently from each other.

In the preferred embodiments of the present invention, even if a plurality of antenna devices operate as a MIMO or diversity system, mutual coupling and an envelope correction coefficient can be lowered between the first slot antenna (main antenna of a transmitting side or a receiving side) and the second slot antenna (sub antenna of a receiving side in the MIMO or diversity system).

Figure 11:
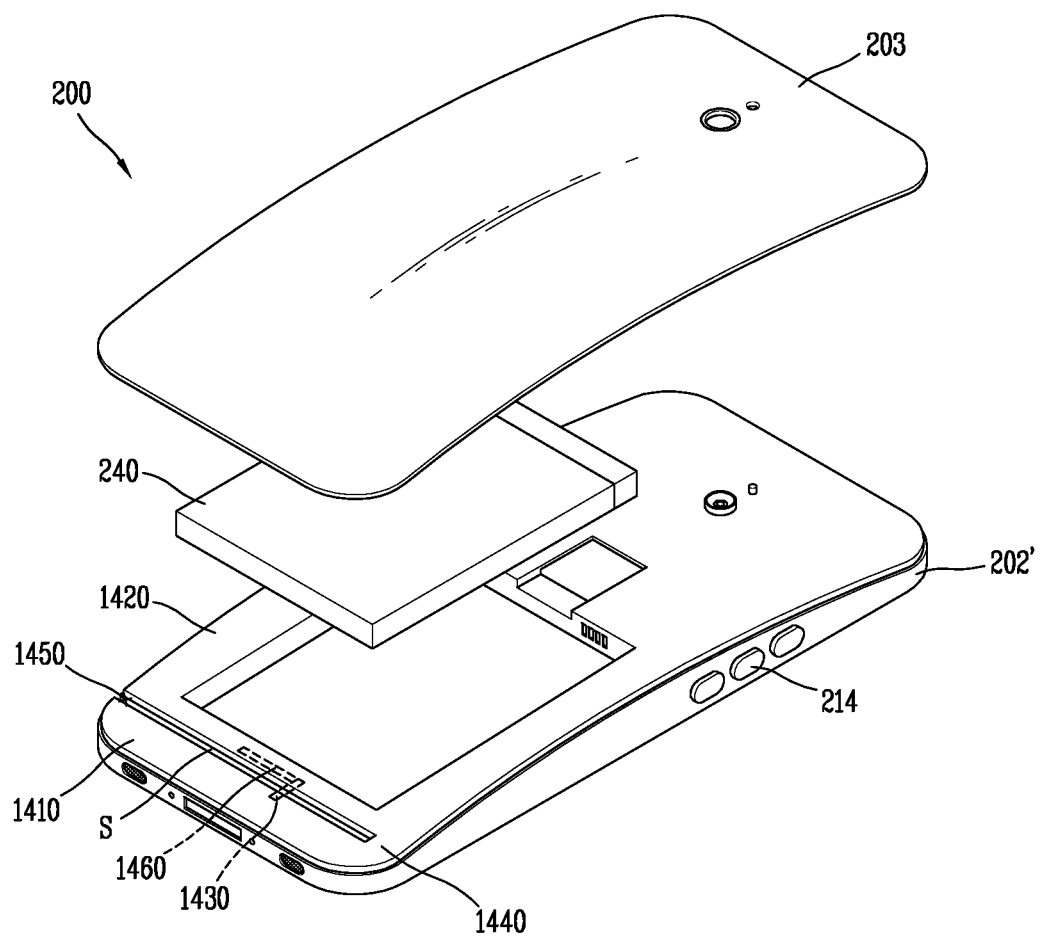
FIG. 11 is a conceptual view showing an antenna device of a mobile terminal according to a fifth embodiment of the present invention.

FIG. 11 is a conceptual view showing an antenna device of a mobile terminal according to a fifth embodiment of the present invention.

A rear case 202', which is covered by the battery case 203 of the mobile terminal, is provided with a slot (S). Based on the slot (S), an upper part of the rear case 202' serves as a first member 1410, and a lower part of the rear case 202' serves as a second member 1420. In this embodiment, the rear case 202' is formed of a conductive material, and is provided with the slot (S). Such slot (S) may be filled with a dielectric substance of a prescribed dielectric constant.

A feeding portion 1430 extends from the second member 1420 toward the first member 1410, and a feeding extension portion 1460 extends from the feeding portion 1430 in a prescribed length.

In this embodiment, the terminal body may have the rear case 202 formed of a conductive material, as a slot antenna.

As the rear case 202' which forms the appearance of the mobile terminal is used as a member of the antenna device, part of the antenna device is positioned at an edge of the terminal body. This can allow an inner structure of the mobile terminal to be designed in a more compact manner.

Figure 12A:
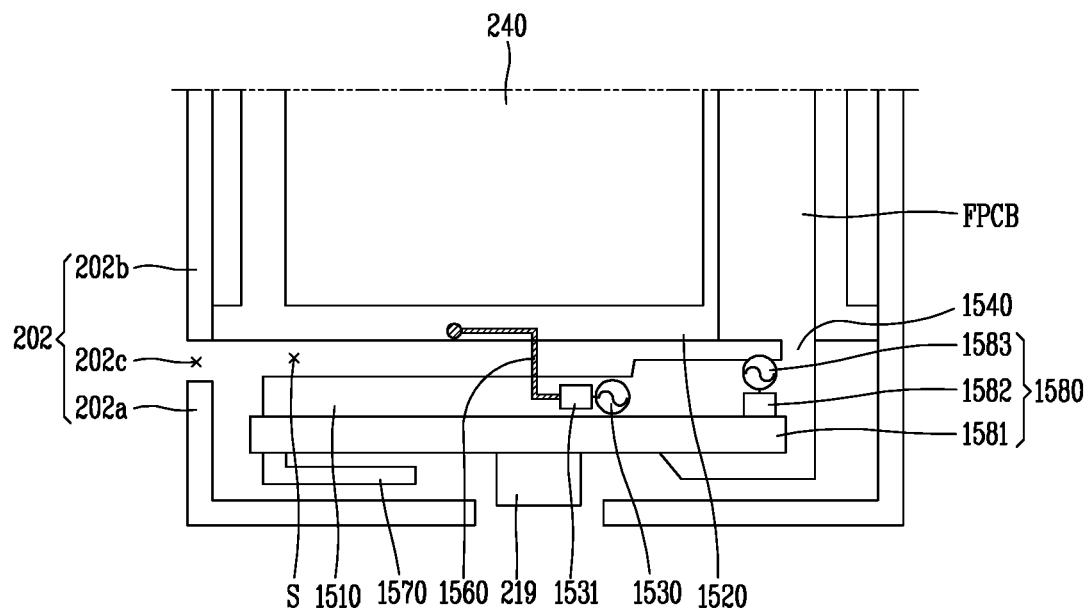
FIG. 12A is a conceptual view showing an antenna device of a mobile terminal according to a sixth embodiment of the present invention.
Figure 12B:
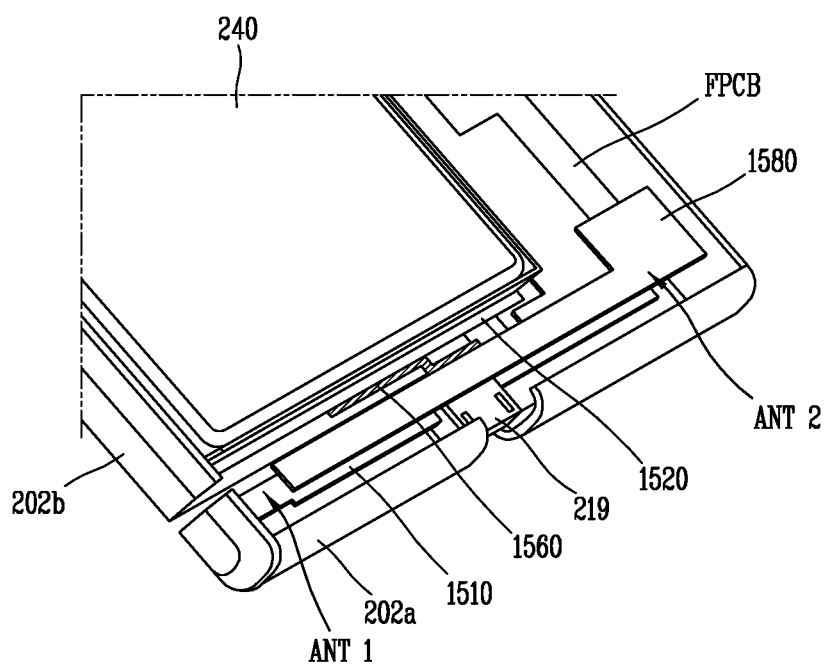
FIG. 12B is a perspective view of the antenna device of FIG. 12A.
Figure 12C:
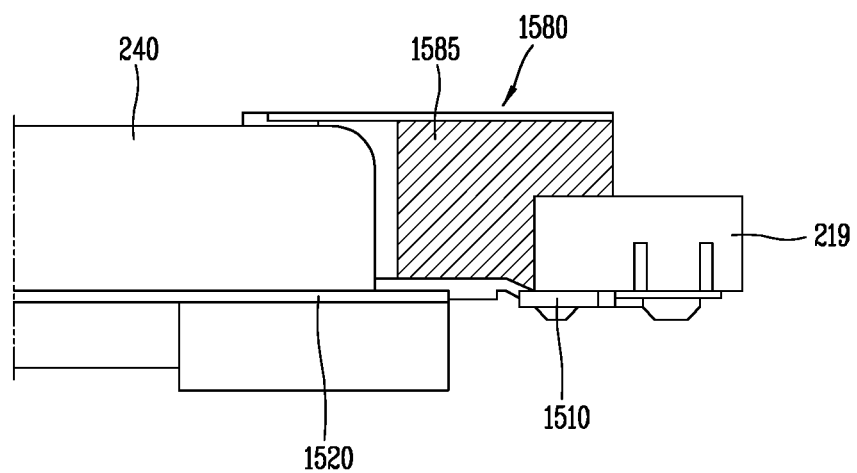
FIG. 12C is a side sectional view of the antenna device of FIG. 12B.

FIG. 12A is a conceptual view showing an antenna device of a mobile terminal according to a sixth embodiment of the present invention, FIG. 12B is a perspective view of the antenna device of FIG. 12A, and FIG. 12C is a side sectional view of the antenna device of FIG. 12B.

In the preferred embodiments of the present invention, a conductive case 202 formed of a conductive material may be disposed to cover a side surface of the mobile terminal. The conductive case 202 forms the appearance of the terminal body. If the appearance of the mobile terminal is formed by the conductive case 202, the mobile terminal can maintain a sufficient strength with a small thickness, and can have a peculiar appearance. In this embodiment, the rear case 202 serves as the conductive case 202. Alternatively, the front case 201 may serve as the conductive case 202.

The conductive case 202 may comprise a first conductive case 202a and a second conductive case 202b. The first conductive case 202a may be disposed at one side or an upper end or a lower end of the terminal body, and the second conductive case 202b may be formed to cover side surfaces of the mobile terminal rather than the first conductive case 202a. If the antenna device is formed in plurality, the first conductive case 202a may be also formed in plurality.

A dielectric substance is formed between the first conductive case 202a and the second conductive case 202b. That is, the first conducive case 202a and the second conducive case 202b are separated from each other in a state a dielectric substance is disposed therebetween. Under such configuration, the first conductive case 202a is separated from a ground of the mobile terminal, to thus be in an electromagnetically-floating state. Accordingly, even if a first antenna device including a first member and a second member is disposed near the first conductive case 202a, an electromagnetic influence on the first antenna device due to the first conductive case 202a is reduced to thus prevent lowering of performance of the first antenna device.

As the first conductive case 202a and the second conductive case 202b are separated from each other, lowering of antenna characteristics due to a body effect can be reduced. The body effect indicates a change of antenna characteristics occurring when a human body contacts or approaches to a specific part of the mobile terminal. For instance, a death grip, a phenomenon that a receiving rate is lowered when a specific part of the mobile terminal is held by a user's hand, may be regarded as the body effect. As shown in FIG. 12B, the first conductive case 202a is disposed on an upper end or a lower end of the mobile terminal, and a user's contact which may influence on performance of the antenna device occurs only on the second conductive case 202b. Under such configuration, lowering of performance of the antenna device due to the body effect can be reduced.

The conductive case 202 is provided with an opening 202c communicated with the slot (S) of the first antenna device. As aforementioned, the opening 202c may be filled with a dielectric substance. Under such configuration, the first conductive case 202a and the second conductive case 202b may be separated from each other by the opening 202c and the socket 219. As the opening 202c is formed using the conductive case 202, an open region of the first antenna device may extend up to outside of the terminal body.

As shown in FIG. 12A, a first antenna device and a second antenna device 1580 are laminated on each other. As an example, the second antenna device 1580 may be disposed to cover the first antenna device. As aforementioned, the first antenna device may comprise a first member 1510, a second member 1520, a feeding portion 330 and a feeding extension portion 360. The second antenna device 1580 may be implemented as a monopole type antenna, a PIFA type antenna, or a folded dipole type antenna.

As aforementioned, the first member 1510 and the second member 1520 of the first antenna device may be implemented as conductive members, and may define a slot (S) of the antenna device. That is, a space between the first member 1510 and the second member 1520 serves as the slot (S) of the antenna device. A feeding portion 1530 is formed so that the antenna device including the slot (S) can resonate in a first frequency band, and a feeding extension portion 1560 is formed so that the antenna device can resonate in a second frequency band.

Radiation in the second frequency band is performed at a central part of the slot (S), not at the opening 202c of the slot (S). This may result in lowering of antenna efficiency in the second frequency band, due to peripheral devices. Accordingly, the antenna device may further a third member 1570 so as to resonate at a third frequency adjacent to the second frequency band. The third member 1570 operates as a sort of stub. The third member 1570 is formed in parallel to the first conductive case 202a.

A matching portion 1531, configured to perform impedance matching in a specific frequency band, may be formed between the feeding portion 1530 and the feeding extension portion 1560.

Referring to FIG. 12C, a carrier 1585 may be formed between the first antenna device (ANT 1) and the second antenna device (ANT 2, 1580). A radiator of the second antenna device 1580 may be implemented as a conductive pattern 1581 printed onto the carrier 1585.

The carrier 1585 is a dielectric substance having a dielectric constant, which may be implemented as FR-3 and CEM-1. The FR-3 is made of multiple plies of paper that have been impregnated with an epoxy-resin binder, and the CEM-1 is a composite material that has a paper core impregnated with epoxy resin. Alternatively, the carrier 1585 may be implemented as CEM-3, FR-4, FR-5 or GI. The CEM-3 impregnated with epoxy resin has woven glass cloth surfaces, and a core of non-woven matte fiberglass. The FR-4 is constructed on multiple plies of epoxy-resin impregnated woven glass cloth. The FR-5 is constructed on multiple plies of reinforced epoxy-resin impregnated woven glass cloth. The GI is constructed on multiple plies of polyimide-resin impregnated woven glass cloth. Alternatively, the carrier 1585 may be implemented as a printed circuit board (PCB).

The second antenna device 1580 is formed to transmit and receive (transceiver) signals in a fourth frequency band. The conductive pattern 1581 serving as a radiator may be formed to have an electric length corresponding to the fourth frequency band.

The conductive pattern 1581 may be connected to a substrate for processing radio signals, by a feeding connector or a grounding connector according to an antenna type. For instance, in case of a monopole type antenna device, the conductive pattern 1581 may be fed and grounded by a feeding connector. On the other hand, in case of a PIFA type antenna device, the conductive pattern 1581, which is provided with a feeding connector and a grounding connector, may be connected to a substrate.

The feeding connector (F) may be configured to electrically connect the feeding portion with the conductive member, and may be configured to feed the conductive member in an EM (Electro-Magnetic) feeding manner. To this end, the feeding connector (F) may include at least one of a feeding board, a feeding clip and a feeding line. As one of the feeding board, the feeding clip and the feeding line is electrically connected to another, current (or voltage) supplied from a feeding device is transferred to the conductive member which transceives (transmits and receives) radio signals. Here, the feeding line may include a microstrip printed onto a substrate.

The grounding connector (G) may be configured to ground-connect the conductive member to a ground, and to perform electrical short, thereby executing impedance matching with respect to a resonant frequency of the antenna device. The grounding connector (G) may be provided with at least two paths of different lengths, and may be provided with switches corresponding to the respective paths. The respective paths connect a ground and a radiator (e.g., conductive member) with each other, in different lengths, by switches thereof. The path serves as an electric passage for connecting a ground with a radiator, which may include at least one of a feeding board, a feeding clip and feeding lines. As feeding lines are formed in different lengths, the paths may have different lengths.

Referring to FIG. 12A, a matching portion 1582 may be formed between the conductive pattern 1581 (radiator) and a feeding connector 1583. The matching portion 1582 may be implemented as a series element or a shunt element. In a case where the matching portion 1582 is implemented as a series element, a reactance, an imaginary number part of an impedance, may be changed. For instance, an inductor may be controlled to have a high reactance, but a capacitor may be controlled to have a low reactance to thus change an impedance in a specific frequency band. On the other hand, in a case where the matching portion 1582 is implemented as a shunt element, a resistance, a real number part of an impedance, may be changed. For instance, an inductor may be controlled to have a high resistance, but a capacitor may be controlled to have a low resistance to thus change an impedance in a specific frequency band.

The mobile terminal may perform communication with radio base stations using radio communication. For instance, a cellular telephone may perform communication using cellular telephone bands of 850 MHz, 900 MHz, 1800 MHz and 1900 MHz (e.g., main global system for mobile communications or GSM cellular telephone bands). Communication should be performed even in a band of 1.92~2.17 GHz for a wideband code division multiple access (WCDMA) service. Further, communication should be performed even in a band of 704~960 MHz for B13 or B17 communication service of LTE (Long Term Evolution). In order for the mobile terminal according to preferred embodiment of the present invention to provide a communication service in multi frequency bands, the antenna device comprises the slot (S), the feeding portion, the feeding extension portion, etc.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. An antenna device, comprising:
a first member and a second member which form a first slot having an open part which is open and a connection part which is closed, one ends of the first and second member being connected with each other and other portions being spaced apart from each other;
a feeding portion having one end connected to one of the first member and the second member such that the antenna device resonates in a first frequency band, and forming an electric field in the first slot;
a feeding extension portion extending from the feeding portion such that the antenna device resonates in a second frequency band; and
a third member extending and bending from end of the second member with a prescribed length, and forming a second slot between the first member and the third member,
wherein the feeding portion is displaced at a first distance where an impedance is a predetermined ohm, when the first slot operates in a first frequency band,
wherein the feeding extension portion extends from the feeding portion by a second distance so that an impedance can be a predetermined ohm, when the first slot operates in a second frequency band,
wherein an opening of the first slot and an opening of the second slot are formed in direction opposite to each other, and
wherein the second slot resonates at a third frequency adjacent to the frequency of the second frequency band so that the third member is configured to extend a bandwidth of the second frequency band.

2. The antenna device of claim 1, wherein a length of the first slot, which is from the connection part to the open part of the first slot, corresponds to $\lambda/4$ or $\lambda/8$ with respect to a wavelength of a center frequency of the first frequency band.

3. The antenna device of claim 1, wherein the first distance is formed such that an impedance of the center frequency of the first frequency band is within 50 ohm by the feeding portion, and
wherein the second distance is formed such that an impedance of a center frequency of the second frequency band is within 50 ohm by the feeding extension portion.

4. The antenna device of claim 3, wherein the feeding portion comprises a shunt element.

5. The antenna device of claim 3, wherein the feeding extension portion comprises a series element.

6. A mobile terminal, comprising:
a terminal body having an upper part and a lower part; and
an antenna device disposed on the upper part or the lower part of the terminal body, and configured to transmit and receive radio signals,
wherein the antenna device comprises:
a first member and a second member which form a first slot having an open part which is open and a connection part which is closed, one ends of the first and second member being connected with each other and other portions being spaced apart from each other;
a feeding portion having one end connected to one of the first member and the second member such that the antenna device resonates in a first frequency band, and forming an electric field in the first slot;
a feeding extension portion extending from the feeding portion such that the antenna device resonates in a second frequency band;
a third member extending and bending from end of the second member with a prescribed length, and forming a second slot between the first member and the third member,
wherein the feeding portion is displaced at a first distance where an impedance is a predetermined ohm, when the first slot operates in a first frequency band,
wherein the feeding extension portion extends from the feeding portion by a second distance so that an impedance can be a predetermined ohm, when the first slot operates in a second frequency band,
wherein an opening of the first slot and an opening of the second slot are formed in direction opposite to each other, and
wherein the second slot resonates at a third frequency adjacent to the frequency of the second frequency band so that the third member is configured to extend a bandwidth of the second frequency band.

7. The mobile terminal of claim 6, wherein the upper part or the lower part of the terminal body, to which the antenna device is mounted, is formed to be slimmer than other parts of the terminal body.

8. The mobile terminal of claim 6, wherein one of the first member and the second member is a conductive frame mounted in the terminal body, and configured to support inside of the terminal body.

9. The mobile terminal of claim 6, wherein one of the first member and the second member is a flexible printed circuit board (FPCB) mounted in the terminal body, and configured to transmit a signal generated from a user input unit to a controller.

10. The mobile terminal of claim 6, wherein one of the first member and the second member is a flexible printed circuit board (FPCB) mounted in the terminal body, and configured to transmit signals input and output from a socket connected to an external device, to a controller.

11. The mobile terminal of claim 6, wherein one of the first member and the second member is a conductive case which forms an appearance of the terminal body.

12. The mobile terminal of claim 6, wherein one of the first member and the second member is a multi-layered printed circuit board having a ground.

13. The mobile terminal of claim 6, wherein a length of the first slot, which is from the connection part to the open part of the first slot, corresponds to 214 or 218 with respect to a wavelength of a center frequency of the first frequency band.

14. The mobile terminal of claim 6, wherein the first distance is formed such that an impedance of the center frequency of the first frequency band is within 50 ohm by the feeding portion, and wherein the second distance is formed such that an impedance of a center frequency of the second frequency band is within 50 ohm by the feeding extension portion.

15. The mobile terminal of claim 6, further comprising a conductive case which forms an appearance of the terminal body, and wherein an opening communicated with the first slot is formed at the conductive case.

16. The mobile terminal of claim 15, wherein the conductive case comprises a first conductive case and a second conductive case, and wherein the first conductive case is separated from the second conductive case by the opening and the socket.

17. The mobile terminal of claim 6, wherein another antenna device, which is configured to transmit and receive radio signals in a fourth frequency band, is disposed to cover the antenna device.

\* \* \* \* \*